(12) United States Patent
Yang et al.

(10) Patent No.: US 11,807,764 B2
(45) Date of Patent: Nov. 7, 2023

(54) INK COMPOSITIONS, PRODUCTION METHOD THEREOF, AND METHOD OF FORMING QUANTUM DOT POLYMER COMPOSITE PATTERN USING THE SAME

(71) Applicant: Samsung Display Co., Ltd., Yongin-si (KR)

(72) Inventors: Hyeyeon Yang, Suwon-si (KR); Shin Ae Jun, Seongnam-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 744 days.

(21) Appl. No.: 16/507,790

(22) Filed: Jul. 10, 2019

(65) Prior Publication Data

US 2020/0017704 A1 Jan. 16, 2020

(30) Foreign Application Priority Data

Jul. 10, 2018 (KR) ........................ 10-2018-0080220

(51) Int. Cl.
| | |
|---|---|
| C09D 11/38 | (2014.01) |
| C08K 5/101 | (2006.01) |
| C08K 5/37 | (2006.01) |
| C09D 11/36 | (2014.01) |
| C08K 3/11 | (2018.01) |
| C08K 5/03 | (2006.01) |
| C08L 33/10 | (2006.01) |
| C08K 3/105 | (2018.01) |
| B82Y 20/00 | (2011.01) |

(52) U.S. Cl.
CPC .............. *C09D 11/38* (2013.01); *C08K 3/105* (2018.01); *C08K 3/11* (2018.01); *C08K 5/03* (2013.01); *C08K 5/101* (2013.01); *C08K 5/37* (2013.01); *C08L 33/10* (2013.01); *C09D 11/36* (2013.01); *B82Y 20/00* (2013.01); *C08K 2201/011* (2013.01)

(58) Field of Classification Search
CPC ............ C08K 3/105; C08K 3/11; C09D 11/36
See application file for complete search history.

(56) References Cited

U.S. PATENT DOCUMENTS

| | | |
|---|---|---|
| 6,986,976 B2 | 1/2006 | Simpson et al. |
| 7,648,651 B2 | 1/2010 | Akutsu et al. |
| 7,867,328 B2 | 1/2011 | Rolly et al. |
| 8,263,683 B2 | 9/2012 | Gibson et al. |
| 8,765,014 B2 | 7/2014 | Cho et al. |
| 9,921,472 B2 | 3/2018 | Yang et al. |
| 10,108,089 B2 | 10/2018 | Gu et al. |
| 10,203,599 B2 | 2/2019 | Kim et al. |
| 10,268,066 B2 | 4/2019 | Lee et al. |
| 10,551,745 B2 | 2/2020 | Zheng et al. |
| 10,787,584 B2 | 9/2020 | Pan et al. |
| 10,827,660 B2 | 11/2020 | Huang et al. |
| 10,947,403 B2 | 3/2021 | Takeshi et al. |
| 10,988,685 B2 | 4/2021 | Ahn et al. |
| 11,021,650 B2 | 6/2021 | Kwon et al. |
| 11,126,080 B2 | 9/2021 | Kim et al. |
| 11,186,767 B2 | 11/2021 | Ahn et al. |
| 11,421,151 B2 | 8/2022 | Cho et al. |
| 2008/0277626 A1 | 11/2008 | Yang et al. |
| 2009/0093122 A1 | 4/2009 | Ueda et al. |
| 2016/0362602 A1 | 12/2016 | Xin et al. |
| 2017/0176854 A1 | 6/2017 | Park et al. |
| 2018/0148638 A1 | 5/2018 | Ahn et al. |
| 2018/0151817 A1 | 5/2018 | Cho et al. |
| 2018/0210335 A1 | 7/2018 | Yang et al. |
| 2018/0230321 A1 | 8/2018 | Pan et al. |
| 2020/0172802 A1 | 6/2020 | Ahn et al. |
| 2021/0139730 A1 | 5/2021 | Isonaka et al. |

(Continued)

FOREIGN PATENT DOCUMENTS

| | | |
|---|---|---|
| CN | 1519659 A | 8/2004 |
| CN | 1882880 A | 12/2006 |

(Continued)

OTHER PUBLICATIONS

Machine translation of KR-2018047317-A (Year: 2018).*

(Continued)

*Primary Examiner* — Wenwen Cai
(74) *Attorney, Agent, or Firm* — CANTOR COLBURN LLP

(57) ABSTRACT

An ink composition includes a quantum dot; a carboxyl group (—COOH)-containing binder polymer; an electrical insulating polymer precursor; a radical initiator; and a liquid vehicle, wherein the liquid vehicle includes a mixture of a first organic compound including a compound represented by Chemical Formula 1, a compound represented by Chemical Formula 2, or a combination thereof, and a second organic compound including a compound represented by Chemical Formula 3, a compound represented by Chemical Formula 4, or a combination thereof:

A-L-ester-R

Chemical Formula 1

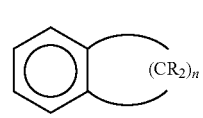

Chemical Formula 2

$R^1$—COO—$[C_nR_{2n+1}O]_m$—$R^2$

Chemical Formula 3

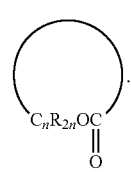

Chemical Formula 4

21 Claims, 5 Drawing Sheets

(56) References Cited

U.S. PATENT DOCUMENTS

| | | |
|---|---|---|
| 2021/0284905 A1 | 9/2021 | Kwon et al. |
| 2021/0286259 A1 | 9/2021 | Park et al. |
| 2022/0004098 A1 | 1/2022 | Kim et al. |

FOREIGN PATENT DOCUMENTS

| | | |
|---|---|---|
| CN | 101175554 A | 5/2008 |
| CN | 103728837 A | 4/2014 |
| CN | 105153811 A | 12/2015 |
| CN | 107429028 A | 12/2017 |
| CN | 108137969 A | 6/2018 |
| CN | 107003608 A | 9/2020 |
| CN | 106468856 A | 1/2022 |
| JP | 200976282 A | 4/2009 |
| JP | 4879614 B2 | 12/2011 |
| JP | 2014-077046 A | 5/2014 |
| KR | 1020090078099 A | 7/2009 |
| KR | 1020090109357 A | 10/2009 |
| KR | 1020110093143 A | 8/2011 |
| KR | 101475520 B1 | 12/2014 |
| KR | 1020160086739 A | 7/2016 |
| KR | 1020170008257 A | 1/2017 |
| KR | 1020170040551 A | 4/2017 |
| KR | 20170047125 A | 5/2017 |
| KR | 1020170046524 A | 5/2017 |
| KR | 1020170073019 A | 6/2017 |
| KR | 1020170109762 A | 10/2017 |
| KR | 20180018891 A | 2/2018 |
| KR | 1020180021870 A | 3/2018 |
| KR | 2018047317 A * | 5/2018 | ............ G02B 5/223 |
| KR | 20180047317 A | 5/2018 |
| KR | 20180059724 A | 6/2018 |
| TW | 201730277 A | 9/2017 |
| WO | 2018123103 A1 | 7/2018 |

OTHER PUBLICATIONS

English Language Summary of Office Action dated Apr. 13, 2022, of the corresponding Chinese Patent Application No. 201910618813.X, 3 pp.

Office Action dated Apr. 13, 2022, of the corresponding Chinese Patent Application No. 201910618813.X, 10 pp.

English Summary of Office Action dated Nov. 2, 2022, of the corresponding Chinese Patent Application No. 201910618813.X, 7 pp.

Office Action dated Nov. 2, 2022, of the corresponding Chinese Patent Application No. 201910618813.X, 14 pp.

English Summary of Office Action dated Apr. 1, 2023, issued in corresponding CN Patent Application No. 201910618813.X, 9 pp.

Office Action dated Apr. 1, 2023, issued in corresponding CN Patent Application No. 201910618813.X, 14 pp.

Korean Office Action for Korean Patent Application No. 10-2018-0080220 dated Jul. 31, 2023

\* cited by examiner

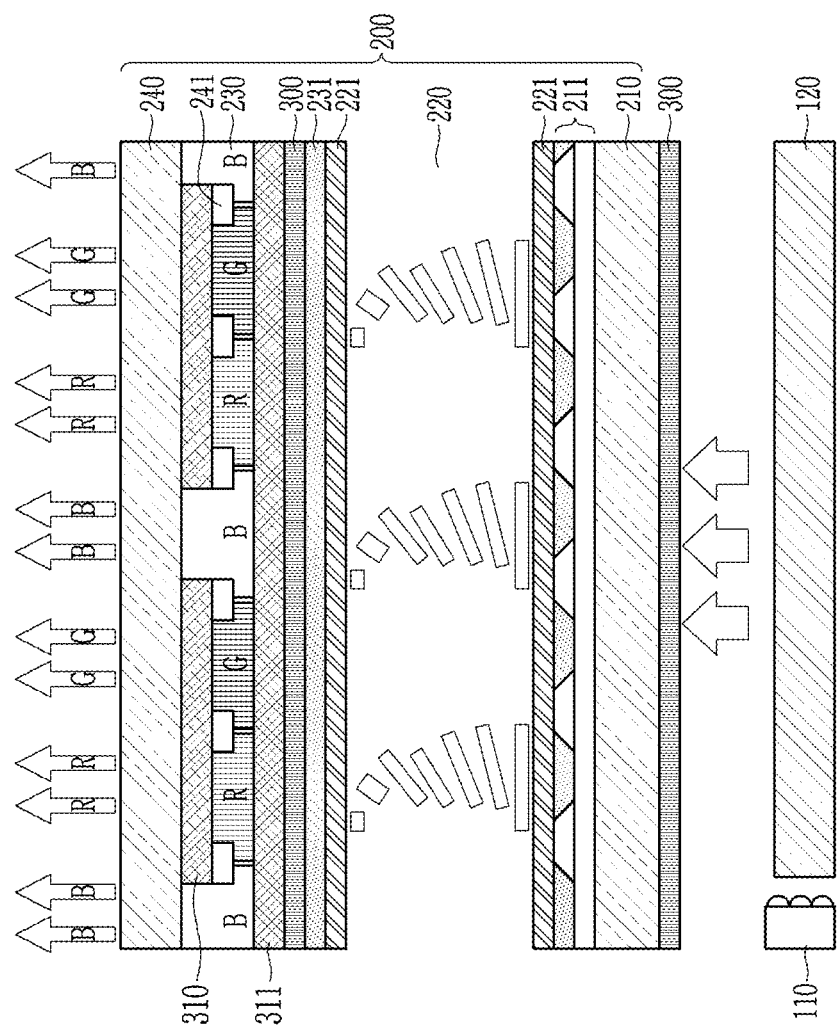

INK COMPOSITIONS, PRODUCTION METHOD THEREOF, AND METHOD OF FORMING QUANTUM DOT POLYMER COMPOSITE PATTERN USING THE SAME

CROSS-REFERENCE TO RELATED APPLICATION

This application claims priority to and the benefit of Korean Patent Application No. 10-2018-0080220 filed in the Korean Intellectual Property Office on Jul. 10, 2018, and all the benefits accruing therefrom under 35 U.S.C. § 119, the content of which in its entirety is herein incorporated herein by reference.

BACKGROUND

1. Field

Ink compositions, production methods thereof, and methods of forming quantum dot-polymer composite patterns are disclosed.

2. Description of the Related Art

Quantum dots may be applicable for various display devices such as a liquid crystal display in the form of a quantum dot-polymer composite. In order to be applied to various display devices, a technique to provide a quantum dot-polymer composite pattern with high efficiency is needed.

SUMMARY

An embodiment provides an ink composition capable of providing a quantum dot-polymer composite pattern.

Another embodiment provides a method of producing such an ink composition.

Another embodiment provides a method of producing a quantum dot-polymer composite pattern using the ink composition.

Another embodiment provides a stack structure including the quantum dot-polymer composite.

Another embodiment provides an electronic device including the quantum dot-polymer composite.

In an embodiment, an ink composition includes
(e.g., a plurality of) quantum dots;
a carboxyl group (—COOH)-containing binder polymer;
an electrical insulating polymer precursor (e.g., a polymerizable monomer including a carbon-carbon double bond);
a radical initiator; and
a liquid vehicle,
wherein the liquid vehicle includes a mixture of a first organic compound and a second organic compound, and
the first organic compound includes a compound represented by Chemical Formula 1, a compound represented by Chemical Formula 2, or a combination thereof:

$$\text{A-L-ester-R} \qquad \text{Chemical Formula 1}$$

wherein, in Chemical Formula 1,
A is a C5 or more substituted or unsubstituted alicyclic hydrocarbon group, L is a single bond, or a substituted or unsubstituted C1 to C10 alkylene group, the ester is COO or OCO, and each instance of R is the same or different and is independently a C1 to C10 substituted or unsubstituted aliphatic hydrocarbon group;

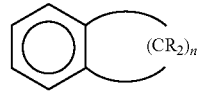

Chemical Formula 2 wherein, in Chemical Formula 2,
n is 6 to 10,
each instance of R is the same or different and is independently hydrogen, or a C1 to C3 alkyl group,
the second organic compound includes a compound represented by Chemical Formula 3, a compound represented by Chemical Formula 4, or a combination thereof:

$$R^1\text{—COO—}[C_nR_{2n+1}O]_m\text{—}R^2 \qquad \text{Chemical Formula 3}$$

wherein, in Chemical Formula 3,
$R^1$ and $R^2$ are the same or different and are independently a C1 to C20 alkyl group, n is an integer of 1 to 3, m is an integer of 1 to 10, and each instance of R is the same or different and is independently hydrogen or a C1 to C10 alkyl group,

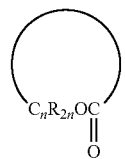

Chemical Formula 4 wherein, in Chemical Formula 4,
each instance of R is the same or different and is independently hydrogen, a C1 to C10 alkyl group, or a C1 to C10 acyl group and n is an integer ranging from 3 to 6.

The ink composition may further include a multiple thiol compound having at least two thiol groups, a metal oxide particulate, or a combination thereof.

The ink composition may not exhibit gelation or cloudiness.

The carboxyl group-containing binder polymer may include a copolymer of a monomer mixture including a first monomer including a carboxyl group and a carbon-carbon double bond, a second monomer including a carbon-carbon double bond and a hydrophobic moiety and not including a carboxyl group, and optionally a third monomer including a carbon-carbon double bond and a hydrophilic moiety and not including a carboxyl group, a multiple aromatic ring-containing polymer having a backbone structure including two aromatic rings bound to a quaternary carbon atom that is a constituent atom of another cyclic moiety in the backbone structure, and including a carboxyl group, or a combination thereof.

The insulating polymer precursor may include a (meth)acrylate monomer including at least one (e.g., at least two, at least three, at least four, or at least five) (meth)acrylate moiety.

The first organic compound may include a compound represented by Chemical Formula 1-1, benzocyclohexane, benzocycloheptane, benzocyclooctane, or a combination thereof:

Chemical Formula 1-1

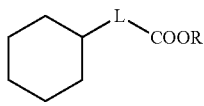

wherein, in Chemical Formula 1-1, L is a single bond or a C1 to C3 substituted or unsubstituted alkylene group, and R is a C1 to C3 alkyl group.

The first organic compound may be an alkylcyclohexane carboxylate.

The liquid vehicle may further include propylene glycol monomethyl ether acetate (PGMEA), and an amount of the propylene glycol monomethyl ether acetate may be less than or equal to about 20 wt % based on a total weight of the liquid vehicle.

The second organic compound may include dipropylene glycol methyl ether acetate, gamma-butyrolactone, 2-(2-butoxyethoxy)ethyl acetate, 2-butoxyethyl acetate, 2-acetyl-butyrolactone, or a combination thereof.

The liquid vehicle may include propylene glycol monomethyl ether acetate (PGMEA), along with an additional second organic compound other than PGMEA, wherein an amount of the propylene glycol monomethyl ether acetate may be less than or equal to about 10 wt % based on a total weight of the liquid vehicle.

An amount of the first organic compound may be greater than or equal to about 40 wt % based on a total weight of the liquid vehicle.

The amount of the first organic compound may be less than 100 wt % based on a total weight of the liquid vehicle.

An amount of the second organic compound may be greater than 0 wt % based on a total weight of the liquid vehicle.

The amount of the second organic compound may be less than or equal to about 60 wt % based on a total weight of the liquid vehicle.

The ink composition may have a viscosity at 25° C. of greater than or equal to about 6.5 centipoise (cPs) and less than or equal to about 8 cPs.

The ink composition may have a surface tension at 23° C. of greater than or equal to about 27 milliNewtons per meter (mN/m) and less than or equal to about 35 mN/m.

The ink composition may have a viscosity at 25° C. of greater than or equal to about 6 cPs and less than or equal to about 6.5 cPs and a surface tension at 23° C. of greater than or equal to about 21 mN/m and less than or equal to about 35 mN/m.

The ink composition may include a quantum dot in an amount of greater than about 40 wt % based on a total weight of the solid content.

The ink composition may include a quantum dot in an amount of greater than or equal to about 45 wt % based on a total weight of the solid content.

The ink composition may be configured to be sprayed through an opening having a width of less than or equal to about 40 μm (micrometers) without clogging the opening.

The ink composition may include
about 1 wt % to about 40 wt % of the quantum dot;
about 0.5 wt % to about 35 wt % of the carboxyl group-containing binder polymer;
about 0.5 wt % to about 20 wt % of the insulating polymer precursor;
about 20 wt % to about 80 wt % of the liquid vehicle; and
about 0.01 wt % to about 10 wt % of the radical initiator.

In another embodiment, a method of preparing an ink composition includes
dispersing quantum dots in the first organic compound to prepare a quantum dot dispersion; and mixing the quantum dot dispersion with the carboxyl group (—COOH)-containing binder polymer, the insulating polymer precursor, the photoinitiator, and the second organic compound.

The mixing may include dissolving the carboxyl group-containing binder polymer, and optionally, the insulating polymer precursor, the photoinitiator, or a combination thereof, in the second organic compound to obtain a second dispersion, and mixing the second dispersion with the quantum dot dispersion.

In another embodiment, a method of producing a quantum dot-polymer composite includes depositing the ink composition on a substrate by a droplet discharging apparatus to form a patterned film; and heating the patterned film to remove the liquid vehicle and to perform polymerization of the insulating polymer precursor.

The ink composition may provide a quantum dot-polymer composite pattern through improved processibility without a separate development process (e.g., through a droplet discharging method, etc.). The ink composition may be stably discharged from an inkjet system without nozzle-clogging or a phase-separation and thus may provide a uniform quantum dot-polymer composite film pattern having a large area through a relatively simple process.

BRIEF DESCRIPTION OF THE DRAWINGS

FIG. 3 is a schematic cross-sectional view showing a device according to a non-limiting embodiment.

DETAILED DESCRIPTION

Figure 1:
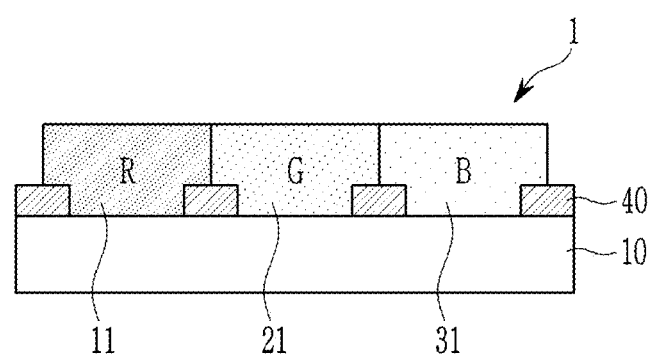
FIG. 1 is a schematic cross-sectional view showing a stack structure according to a non-limiting embodiment.

Advantages and characteristics of this disclosure, and a method for achieving the same, will become evident referring to the following example embodiments together with the drawings attached hereto. However, the embodiments should not be construed as being limited to the embodiments set forth herein. If not defined otherwise, all terms (including technical and scientific terms) in the specification may be defined as commonly understood by one skilled in the art. The terms defined in a generally-used dictionary may not be interpreted ideally or exaggeratedly unless clearly defined. In addition, unless explicitly described to the contrary, the word "comprise" and "include" and variations such as "comprises" or "comprising", and "includes" or "including" will be understood to imply the inclusion of stated elements but not the exclusion of any other elements.

Further, the singular includes the plural unless mentioned otherwise. "At least one" is not to be construed as limiting "a" or "an." "Or" means "and/or." As used herein, the term "and/or" includes any and all combinations of one or more of the associated listed items.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, the thickness of layers, films, panels, regions, etc., are exaggerated for clarity. Like reference numerals designate like elements throughout the specification.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, when a definition is not otherwise provided, "substituted" refers to replacement of hydrogen of a compound, a group, or a moiety by a C1 to C30 alkyl group, a C2 to C30 alkenyl group, a C2 to C30 alkynyl group, a C2 to C30 epoxy group, a C2 to C30 alkyl ester group (—O(=O)OR, wherein R is a C1 to C29 alkyl group), a C7 to C13 aryl ester group (—C(=O)OR wherein R is a C6 to C12 aryl group), a C3 to C30 alkenyl ester group (—O(=O)OR wherein R is a C2 to C29 alkenyl group, e.g., an alkenyl ester group such as an acrylate group, a methacrylate group, or the like), a C6 to C30 aryl group, a C7 to C30 alkylaryl group, a C1 to C30 alkoxy group, a C1 to C30 heteroalkyl group, a C3 to C30 heteroalkylaryl group, a C3 to C30 cycloalkyl group, a C3 to C15 cycloalkenyl group, a C3 to C30 cycloalkynyl group, a C2 to C30 heterocycloalkyl group, a halogen (—F, —Cl, —Br, or —I), a hydroxy group (—OH), a nitro group (—NO$_2$), a cyano group (—CN), an amino group (—NRR' wherein R and R' are independently hydrogen or a C1 to C6 alkyl group), an azido group (—N$_3$), an amidino group (—O(=NH)NH$_2$), a hydrazino group (—NHNH$_2$), a hydrazono group (=N(NH$_2$)), an aldehyde group (—O(=O)H), a carbamoyl group (—C(O)NH$_2$), a thiol group (—SH), a carboxyl group (—COOH) or a salt thereof (—O(=O)OM, wherein M is an organic or inorganic cation), a sulfonic acid group (—SO$_3$H) or a salt thereof (—SO$_3$M, wherein M is an organic or inorganic cation), a phosphoric acid group (—PO$_3$H$_2$) or a salt thereof (—PO$_3$MH or —PO$_3$M$_2$, wherein M is an organic or inorganic cation), or a combination thereof.

Herein, "monovalent organic functional group" refers to a C1 to C30 alkyl group, a C2 to C30 alkynyl group, a C6 to C30 aryl group, a C7 to C30 alkylaryl group, a C1 to C30 alkoxy group, a C1 to C30 heteroalkyl group, a C3 to C30 heteroalkylaryl group, a C3 to C30 cycloalkyl group, a C3 to C15 cycloalkenyl group, a C3 to C30 cycloalkynyl group, or a C2 to C30 heterocycloalkyl group.

As used herein, when a definition is not otherwise provided, the term "hetero" refers to inclusion of one to three of N, O, S, Si, Se, P, or a combination thereof.

As used herein, "alkylene group" refers to a straight or branched saturated aliphatic hydrocarbon group having at least two valences and optionally substituted with a substituent. As used herein, "arylene group" refers to a functional group having at least two valences obtained by removal of at least two hydrogens in an aromatic ring, and optionally substituted with a substituent. As used herein, "alkyl group" refers to a monovalent linear or branched saturated aliphatic hydrocarbon group (e.g., optionally including a substituent).

In addition, "aliphatic" or "aliphatic organic group" refers to a C1 to C30 linear or branched hydrocarbon group (e.g., a C1 to C30 alkyl, a C2 to C30 alkenyl, or a C2 to C30 alkynyl), "aromatic" or "aromatic organic group" refers to a C6 to C30 aryl group or a C1 to C30 heteroaryl group, and "alicyclic" or "alicyclic organic group" refers to a cyclic hydrocarbon group. The alicyclic organic group may include a C3 to C30 cycloalkyl group, a C3 to C30 cycloalkenyl group, or a C3 to C30 cycloalkynyl group.

As used herein, "(meth)acrylate" refers to acrylate and/or methacrylate.

As used herein, "C1-C10 acyl group" refers to a group of the formula —C(O)R, wherein the carbonyl carbon is not included in the number of carbons (i.e., C1-C10) of the acyl group. For example, —C(O)CH$_3$ is a C1 acyl group.

As used herein, "hydrophobic moiety" refers to an aliphatic hydrocarbon group having a carbon number of 2 or greater (alkyl, alkenyl, alkynyl, etc.), an aromatic hydrocarbon group having a carbon number of 6 or greater (phenyl, naphthyl, arylalkyl group, etc.), or an alicyclic hydrocarbon group having a carbon number of 5 or greater (cyclohexyl, norbornene, etc.).

As used herein, a "dispersion" refers to a solid dispersed phase and a liquid continuous medium. For example, a "dispersion" may refer to a colloidal dispersion wherein the dispersed phase has a dimension of greater than or equal to about 1 nanometer (nm) (e.g., greater than or equal to about 10 nm, greater than or equal to about 50 nm, or greater than or equal to about 100 nm) or several micrometers (μm) or less (e.g., less than or equal to about 5 μm, less than or equal to about 4 μm, less than or equal to about 3 μm, less than or equal to about 2 μm, or less than or equal to about 1 μm).

As used herein, "Group" refers to a group of the Periodic Table.

As used herein, "Group II" refers to Group IIA or Group IIB, and examples of a Group II metal may include Cd, Zn, Hg, and Mg, but are not limited thereto.

As used herein, "Group III" refers to Group IIIA or Group IIIB, and examples of a Group III metal may include Al, In, Ga, and Tl, but are not limited thereto.

As used herein, "Group IV" refers to Group IVA or Group IVB, and examples of a Group IV metal may include Si, Ge, and Sn, but are not limited thereto. As used herein, the term "metal" may include a semi-metal such as Si.

As used herein, "Group I" refers to Group IA or Group IB, and examples may include Li, Na, K, Rb, and Cs, but are not limited thereto.

As used herein, "Group V" refers to Group VA, and examples may include nitrogen, phosphorus, arsenic, antimony, and bismuth, but are not limited thereto.

As used herein, "Group VI" refers to Group VIA, and examples may include sulfur, selenium, and tellurium, but are not limited thereto.

In an embodiment, an ink composition includes (e.g., a plurality of) quantum dots; a carboxyl group (—COOH)-containing binder polymer; an electrical insulating polymer precursor; a radical initiator; and a liquid vehicle. The ink composition may be in a dispersed state. In an embodiment, the ink composition may comprise about 1 wt % to about 40 wt % of the quantum dot; about 0.5 wt % to about 35 wt % of the carboxyl-group containing binder polymer; about 0.5 wt % to about 20 wt % of the electrical insulating polymer precursor; about 20 wt % to about 80 wt % of the liquid vehicle; and about 0.01 wt % to about 10 wt % of the radical initiator.

The quantum dot (hereinafter, also referred to as a semiconductor nanocrystal) may include a Group II-VI compound, a Group III-V compound, a Group IV-VI compound, a Group IV element or compound, a Group I-III-VI compound, a Group 11-III-VII compound, a Group I-II-IV-VI compound, or a combination thereof.

The Group II-VI compound may include a binary element compound including CdSe, CdTe, ZnS, ZnSe, ZnTe, ZnO, HgS, HgSe, HgTe, MgSe, MgS, or a mixture thereof; a ternary element compound including CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, or a mixture thereof; and a quaternary element compound including HgZnTeS, CdZnSeS, CdZnSeTe, CdZnSTe, CdHgSeS, CdHgSeTe, CdHgSTe, HgZnSeS, HgZnSeTe, HgZnSTe, or a mixture thereof. The Group II-VI compound may further include a Group III metal. The Group III-V compound may include a binary element compound including GaN, GaP, GaAs, GaSb, AlN, AlP, AlAs, AlSb, InN, InP, InAs, InSb, or a mixture thereof; a ternary element compound including GaNP, GaNAs, GaNSb, GaPAs, GaPSb, AlNP, AlNAs, AlNSb, AlPAs, AlPSb, InNP, InNAs, InNSb, InPAs, InPSb, or a mixture thereof; or a quaternary element compound including GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, InZnP, or a mixture thereof. The Group III-V compound may further include a Group II metal (e.g., InZnP). The Group IV-VI compound may include a binary element compound including SnS, SnSe, SnTe, PbS, PbSe, PbTe, or a mixture thereof; a ternary element compound including SnSeS, SnSeTe, SnSTe, PbSeS, PbSeTe, PbSTe, SnPbS, SnPbSe, SnPbTe, or a mixture thereof; or a quaternary element compound including SnPbSSe, SnPbSeTe, SnPbSTe, or a mixture thereof. Examples of the Group compound may include CuInSe$_2$, CuInS$_2$, CuInGaSe, and CuInGaS, but are not limited thereto. Examples of the Group I—II-IV-VI compound may include CuZnSnSe and CuZnSnS, but are not limited thereto. The Group IV element or compound may be a single substance including Si, Ge, or a mixture thereof; or a binary element compound including SiC, SiGe, or a mixture thereof.

The binary element compound, the ternary element compound, or the quaternary element compound respectively may exist in a uniform concentration in the particle or partially different concentrations in the same particle. The semiconductor nanocrystal may have a core/shell structure wherein a first semiconductor nanocrystal surrounds another second semiconductor nanocrystal. The core and the shell may have an interface, and an element of the shell in the interface may have a concentration gradient wherein the concentration of the element(s) decreases toward the core. The semiconductor nanocrystal may have a structure including one semiconductor nanocrystal core and a multi-layered shell surrounding the same. Herein, the multi-layered shell may have at least two shells wherein each shell may be a single composition, an alloy, and/or a single composition or an alloy having a concentration gradient In the quantum dot, the shell material and the core material may have different energy bandgap from each other. For example, the energy bandgap of the shell material may be greater than that of the core material. According to another embodiment, the energy bandgap of the shell material may less than that of the core material. The quantum dot may have a multi-layered shell. In the multi-layered shell, the energy bandgap of the outer layer may be greater than the energy bandgap of the inner layer (i.e., the layer nearer to the core). In the multi-layered shell, the energy bandgap of the outer layer may be less than the energy bandgap of the inner layer. The quantum dot may control an absorption/photoluminescence wavelength by adjusting a composition and a size. A maximum photoluminescence peak wavelength of the quantum dot may be an ultraviolet (UV) to infrared ray wavelength or a wavelength of greater than the above wavelength range. For example, the maximum photoluminescence peak wavelength of the quantum dot may be greater than or equal to about 300 nm, for example, greater than or equal to about 500 nm, greater than or equal to about 510 nm, greater than or equal to about 520 nm, greater than or equal to about 530 nm, greater than or equal to about 540 nm, greater than or equal to about 550 nm, greater than or equal to about 560 nm, greater than or equal to about 570 nm, greater than or equal to about 580 nm, greater than or equal to about 590 nm, greater than or equal to about 600 nm, or greater than or equal to about 610 nm. The maximum photoluminescence wavelength of the quantum dot may be less than or equal to about 800 nm, for example, less than or equal to about 650 nm, less than or equal to about 640 nm, less than or equal to about 630 nm, less than or equal to about 620 nm, less than or equal to about 610 nm, less than or equal to about 600 nm, less than or equal to about 590 nm, less than or equal to about 580 nm, less than or equal to about 570 nm, less than or equal to about 560 nm, less than or equal to about 550 nm, or less than or equal to about 540 nm. The maximum photoluminescence wavelength of the quantum dot may be in the range of about 500 nm to about 650 nm. The maximum photoluminescence wavelength of the quantum dot may be in the range of about 500 nm to about 540 nm. The maximum photoluminescence wavelength of the quantum dot may be in the range of about 610 nm to about 640 nm.

The quantum dot may have quantum efficiency of greater than or equal to about 10%, for example, greater than or equal to about 30%, greater than or equal to about 50%, greater than or equal to about 60%, greater than or equal to about 70%, greater than or equal to about 90%, or even about 100%. The quantum dot may have a relatively narrow spectrum so as improve color purity or color reproducibility. The quantum dot may have for example a full width at half maximum (FWHM) of a photoluminescence wavelength spectrum of less than or equal to about 50 nm, for example, less than or equal to about 45 nm, less than or equal to about 40 nm, or less than or equal to about 30 nm.

The quantum dot may have a particle size (e.g., a diameter or the largest linear length crossing the particle) of greater than or equal to about 1 nm and less than or equal to about 100 nm. The quantum dot may have a particle size of about 1 nm to about 20 nm, for example, greater than or equal to about 2 nm, greater than or equal to about 3 nm, or greater than or equal to about 4 nm and less than or equal to about 50 nm, less than or equal to about 40 nm, less than or equal to about 30 nm, less than or equal to about 20 nm, less than or equal to about 15 nm, or less than or equal to about 10 nm. A shape of the quantum dot is not particularly limited. For example, the shape of the quantum dot may be a sphere, a polyhedron, a pyramid, a multipod, a square, a rectangular parallelepiped, a nanotube, a nanorod, a nanowire, a nanosheet, or a combination thereof, but is not limited thereto.

The quantum dot may be commercially available or may be appropriately synthesized. When the quantum dot is colloid-synthesized, the particle size may be relatively freely controlled and also uniformly controlled.

The quantum dot may include an organic ligand (e.g., having a hydrophobic moiety). The organic ligand moiety may be bound to a surface of the quantum dot. The organic ligand may include RCOOH, $RNH_2$, $R_2NH$, $R_3N$, RSH, $R_3PO$, $R_3P$, ROH, RCOOR, $RPO(OH)_2$, RHPOOH, RHPOOH, RHPOOH, or a combination thereof, wherein each instance of R is the same or different and is independently a C3 to C24 substituted or unsubstituted aliphatic hydrocarbon group such as C3 to C24 alkyl or alkenyl, a C6 to C20 substituted or unsubstituted aromatic hydrocarbon group such as a C6 to C20 aryl group, or a combination thereof.

Examples of the organic ligand may be a thiol compound such as methanethiol, ethanethiol, propanethiol, butanethiol, pentanethiol, hexanethiol, octanethiol, dodecanethiol, hexadecanethiol, octadecanethiol, or benzyl thiol; an amine such as methylamine, ethylamine, n-propylamine, isopropylamine, n-butylamine, sec-butylamine, tert-butylamine, pentylamine, hexylamine, octylamine, nonylamine, decylamine, dodecylamine, hexadecylamine, octadecylamine, dimethylamine, diethylamine, dipropylamine, tributylamine, or trioctylamine; a carboxylic acid compound such as methanoic acid, ethanoic acid, propanoic acid, butanoic acid, pentanoic acid, hexanoic acid, heptanoic acid, octanoic acid, dodecanoic acid, hexadecanoic acid, octadecanoic acid, oleic acid, or benzoic acid; a phosphine compound such as methylphosphine, ethylphosphine, propylphosphine, butylphosphine, pentylphosphine, octylphosphine, dioctyl phosphine, tributylphosphine, trioctylphosphine, diphenyl phosphine, or triphenyl phosphine; a phosphine oxide compound thereof such methyl phosphine oxide, ethyl phosphine oxide, propyl phosphine oxide, butyl phosphine oxide, pentyl phosphine oxide, tributylphosphine oxide, octylphosphine oxide, dioctyl phosphine oxide, trioctylphosphine oxide, a diphenyl phosphine oxide, triphenyl phosphine oxide; C5 to C20 alkyl phosphonic acid such as hexylphosphonic acid, octylphosphonic acid, dodecanephosphonic acid, tetradecanephosphonic acid, hexadecanephosphonic acid, octadecanephosphonic acid; and the like, but are not limited thereto. The quantum dot may include a hydrophobic organic ligand alone or a mixture of hydrophobic organic ligands. The hydrophobic organic ligand may not include a photopolymerizable moiety (e.g., acrylate group, methacrylate group, etc.).

The ink composition may include a relatively large amount of quantum dots. The ink composition according to an embodiment includes a liquid vehicle which will be described later, and even when the quantum dots are included in an increased amount, may provide a uniform quantum dot polymer-composite thin film (or pattern), for example, through a droplet discharging method, without a nozzle-clogging or a phase-separation.

An amount of the quantum dots may be greater than or equal to about 40 wt %, for example, greater than or equal to about 41 wt %, greater than or equal to about 42 wt %, greater than or equal to about 43 wt %, greater than or equal to about 44 wt %, greater than or equal to about 45 wt %, greater than or equal to about 46 wt %, greater than or equal to about 47 wt %, greater than or equal to about 48 wt %, greater than or equal to about 49 wt %, or greater than or equal to about 50 wt % based on a total solid content of the composition. The amount of the quantum dot may be less than or equal to about 90 wt %, for example, 85 wt %, less than or equal to about 80 wt %, less than or equal to about 75 wt %, or less than or equal to about 70 wt % based on a total solid content of the composition.

The composition according to an embodiment includes a carboxyl group-containing binder. The binder is a non-conjugated polymer. The composition according to an embodiment does not include a conjugated polymer or a precursor (e.g., monomer) for the conjugated polymer.

An acid value of the carboxyl group-containing binder may be greater than or equal to about 50 mg KOH/g, for example, greater than or equal to about 80 mg KOH/g, greater than or equal to about 90 mg KOH/g, greater than or equal to about 100 mg KOH/g, greater than or equal to about 110 mg KOH/g, or greater than or equal to about 120 mg KOH/g and less than or equal to about 200 mg KOH/g, for example less than or equal to about 190 mg KOH/g. The acid value of the carboxyl group-containing binder may be about 100 to about 190 mg KOH/gram. The carboxyl group-containing binder may include a copolymer of a monomer mixture including a first monomer including a carboxyl group and a carbon-carbon double bond, a second monomer including a carbon-carbon double bond and a hydrophobic moiety and not including a carboxyl group, and optionally a third monomer including a carbon-carbon double bond and a hydrophilic moiety and not including a carboxyl group; a multiple aromatic ring-containing polymer having a backbone structure including two aromatic rings bound to a quaternary carbon atom that is a constituent atom of another cyclic moiety in the backbone structure (i.e., main chain), and including a carboxyl group; or a combination thereof. The multiple aromatic ring-containing polymer may include a carboxyl group (—COOH) bound to the main chain.

A display including a photoluminescent type color filter instead of an absorptive color filter is expected to exhibit a wide viewing angle and improved luminance. A color filter including quantum dots may achieve increased luminous efficiency and improved color reproducibility. A quantum dot-polymer composite pattern may be included in the photoluminescent type color filter. The carboxyl group-containing binder may substantially contribute to dispersibility of quantum dots in the ink composition.

Specific examples of the first monomer may include acrylic acid, methacrylic acid, maleic acid, itaconic acid, fumaric acid, 3-butanoic acid, or a carbonic acid vinyl ester compound such as vinyl acetate, vinyl benzoate, and the like, but are not limited thereto. The first monomer may include one or more compounds.

Specific examples of the second monomer may be alkenyl aromatic compounds such as styrene, α-methyl styrene, vinyl toluene, or vinyl benzyl methyl ether; unsaturated carbonic acid ester compounds such as methyl acrylate, methyl methacrylate, ethyl acrylate, ethyl methacrylate, butyl acrylate, butyl methacrylate, benzyl acrylate, benzyl methacrylate, cyclohexyl acrylate, cyclohexyl methacrylate, phenyl acrylate, or phenyl methacrylate; unsaturated carbonic acid amino alkyl ester compounds such as 2-aminoethyl acrylate, 2-aminoethyl methacrylate, 2-dimethylamino ethyl acrylate, or 2-dimethylamino ethyl methacrylate; maleimides such as N-phenylmaleimide, N-benzylmaleimide, or N-alkylmaleimide; unsaturated carbonic acid glycidyl ester compounds such as glycidyl acrylate or glycidyl methacrylate; vinyl cyanide compounds such as acrylonitrile or methacrylonitrile; unsaturated amide compounds such as acryl amide or methacryl amide, but are not limited thereto. The second monomer may include one or more compounds.

Specific examples of the third monomer may include 2-hydroxyethyl acrylate, 2-hydroxyethyl methacrylate, 2-hydroxybutyl acrylate, or 2-hydroxybutyl methacrylate, but are not limited thereto. The third monomer may include one or more compounds.

In the carboxyl group-containing binder polymer, an amount of the first repeating unit derived from the first monomer may be greater than or equal to about 10 mol %, for example, greater than or equal to about 15 mol %, greater than or equal to about 25 mol %, or greater than or equal to about 35 mol %. In the carboxyl group-containing binder, the amount of the first repeating unit derived from the first monomer may be less than or equal to about 90 mol %, for example, less than or equal to about 89 mol %, less than or equal to about 80 mol %, less than or equal to about 70 mol %, less than or equal to about 60 mol %, less than or equal to about 50 mol %, less than or equal to about 40 mol %, less than or equal to about 35 mol %, or less than or equal to about 25 mol %.

In the carboxyl group-containing binder polymer, an amount of the second repeating unit derived from the second monomer may be greater than or equal to about 10 mol %, for example, greater than or equal to about 15 mol %, greater than or equal to about 25 mol %, or greater than or equal to about 35 mol %. In the carboxyl group-containing binder polymer, the amount of the second repeating unit derived from the second monomer may be less than or equal to about 90 mol %, for example, 89 mol %, less than or equal to about 80 mol %, less than or equal to about 70 mol %, less than or equal to about 60 mol %, less than or equal to about 50 mol %, less than or equal to about 40 mol %, less than or equal to about 35 mol %, or less than or equal to about 25 mol %.

In the carboxyl group-containing binder polymer, an amount of the third repeating unit derived from the third monomer if present may be greater than or equal to about 1 mol %, for example, greater than or equal to about 5 mol %, greater than or equal to about 10 mol %, or greater than or equal to about 15 mol %. In the carboxylic group-containing binder polymer, the amount of the third repeating unit derived from the third monomer may be less than or equal to about 30 mol %, for example, less than or equal to about 25 mol %, less than or equal to about 20 mol %, less than or equal to about 18 mol %, less than or equal to about 15 mol %, or less than or equal to about 10 mol %.

The carboxylic group-containing binder polymer may be a copolymer of (meth)acrylic acid; and a second monomer, third monomer, or a combination thereof, wherein the second monomer and the third monomer are each independently arylalkyl(meth)acrylate, hydroxyalkyl(meth)acrylate, or styrene.

For example, the binder polymer may be a methacrylic acid/methyl methacrylate copolymer, a methacrylic acid/benzyl methacrylate copolymer, a methacrylic acid/benzyl methacrylate/styrene copolymer, a methacrylic acid/benzyl methacrylate/2-hydroxyethyl methacrylate copolymer, or a methacrylic acid/benzyl methacrylate/styrene/2-hydroxyethyl methacrylate copolymer.

The carboxyl group-containing binder polymer may include a multiple aromatic ring-containing polymer. The multiple aromatic ring-containing polymer is known as a cardo binder resin and may be commercially available. For example, the multiple aromatic ring-containing polymer may include a moiety derived from reaction products of fluorene compounds including 9,9-bis(4-hydroxyphenyl)fluorene, 9,9-bis(4-aminophenyl)fluorene), 9,9-bis[4-(glycidyloxy)phenyl]fluorene, 9,9-bis[4-(2-hydroxyethoxy)phenyl]fluorene, or 9,9-bis-(3,4-dicarboxyphenyl)fluorene dianhydrides and desirable compounds capable of reacting with the fluorene compounds (e.g., an aromatic acid dianhydride such as pyromellitic dianhydride (PDMA), biphenyltetracarboxylic dianhydride (BPDA), benzophenoltetracarboxylic dianhydride, or naphthalenetetracarboxylic dianhydride, C2 to C30 diol compounds, epichlorohydrin, etc.).

The carboxyl group-containing binder polymer may have an acid value of greater than or equal to about 50 mg KOH/g. For example, the carboxyl group-containing binder polymer may have an acid value of greater than or equal to about 60 mg KOH/g, greater than or equal to about 70 mg KOH/g, greater than or equal to about 80 mg KOH/g, greater than or equal to about 90 mg KOH/g, greater than or equal to about 100 mg KOH/g, greater than or equal to about 110 mg KOH/g, greater than or equal to about 120 mg KOH/g, greater than or equal to about 125 mg KOH/g, or greater than or equal to about 130 mg KOH/g. The acid value of the binder polymer may be, for example, less than or equal to about 250 mg KOH/g, for example, less than or equal to about 240 mg KOH/g, less than or equal to about 230 mg KOH/g, less than or equal to about 220 mg KOH/g, less than or equal to about 210 mg KOH/g, less than or equal to about 200 mg KOH/g, less than or equal to about 190 mg KOH/g, less than or equal to about 180 mg KOH/g, or less than or equal to about 160 mg KOH/g, but is not limited thereto.

A weight average molecular weight of the binder polymer may be greater than or equal to about 1,000 g/mol, for example, greater than or equal to about 2,000 g/mol, greater than or equal to about 3,000 g/mol, or greater than or equal to about 5,000 g/mol. The weight average molecular weight of the binder polymer may be less than or equal to about 100,000 g/mol, for example, less than or equal to about 50,000 g/mol.

The carboxyl group-containing binder polymer may be a polymer including a non-conjugated moiety (e.g., non-conjugated polymer). The carboxyl group-containing binder polymer may have a main chain including non-conjugated moieties (or consisting of non-conjugated moieties).

In the composition, an amount of the carboxyl group-containing binder polymer may be greater than or equal to about 1 wt %, greater than or equal to about 2 wt %, greater than or equal to about 3 wt %, greater than or equal to about 4 wt %, greater than or equal to about 5 wt %, greater than or equal to about 6 wt %, greater than or equal to about 7 wt %, or greater than or equal to about 8 wt % based on a total weight of the solid (i.e., non-volatile components) of the composition. The amount of the carboxyl group-containing binder polymer may be less than or equal to about 70 wt %, less than or equal to about 65 wt %, less than or equal to about 60 wt %, less than or equal to about 55 wt %, less than or equal to about 50 wt %, less than or equal to about 45 wt %, less than or equal to about 40 wt %, or less than or equal to about 35 wt % based on a total weight of the solid (i.e., non-volatile components of the composition. The amount of the binder polymer may desirably be controlled in order to ensure dispersibility of quantum dots and formation of a uniform film.

The ink composition according to an embodiment may include a precursor (i.e., monomer) for the electrical insulating polymer. The monomer may be an acrylate monomer including at least one, for example, at least two, at least three, at least four, at least five, at least six or more carbon-carbon double bonds (e.g., an acrylate group or a methacrylate group). The electrical insulating polymer may be a non-conjugated polymer. The types of the monomer are not particularly limited as long as the monomer includes a carbon-carbon double bond and is capable of a radical polymerization. For example, the monomer may be a mono-functional or multi-functional ester of (meth)acrylic acid having an ethylenically unsaturated double bond. For example, the monomer may be a vinyl monomer, an unsaturated ethylene oligomer, a homopolymer thereof, or a copolymer of the unsaturated ethylene oligomer and an ethylenically unsaturated monomer.

The acrylate monomer may include alkyl(meth)acrylate, ethylene glycol di(meth)acrylate, triethylene glycol di(meth) acrylate, diethylene glycol di(meth)acrylate, 1,4-butanediol di(meth)acrylate, 1,6-hexanediol di(meth)acrylate, neopentylglycol di(meth)acrylate, pentaerythritol di(meth)acrylate, pentaerythritol tri(meth)acrylate, pentaerythritol tetra(meth) acrylate, dipentaerythritol di(meth)acrylate, dipentaerythritol tri(meth)acrylate, dipentaerythritol penta(meth)acrylate, pentaerythritol hexa(meth)acrylate, bisphenol A di(meth) acrylate, bisphenol A epoxyacrylate, trimethylolpropane tri (meth)acrylate, ethylene glycol monomethyl ether (meth) acrylate, novolacepoxy (meth)acrylate, diethylene glycol di(meth)acrylate, triethylene glycol di(meth)acrylate, propylene glycol di(meth)acrylate, tris(2-methacryloyloxy) ethyl phosphate, or a combination thereof. The monomer according to an embodiment may include a di(meth)acrylate compound, a tri(meth)acrylate compound, a tetra(meth) acrylate compound, a penta(meth)acrylate compound, a hexa(meth)acrylate compound, or a combination thereof, but is not limited thereto.

An amount of the precursor (i.e., monomer) of the electrical insulating polymer may be greater than or equal to about 0.5 wt %, for example, greater than or equal to about 1 wt % or greater than or equal to about 2 wt %, based on a total solid content of the composition. The amount of the photopolymerizable monomer may be less than or equal to about 30 wt %, for example, less than or equal to about 28 wt %, less than or equal to about 25 wt %, less than or equal to about 23 wt %, less than or equal to about 20 wt %, less than or equal to about 18 wt %, less than or equal to about 17 wt %, less than or equal to about 16 wt %, or less than or equal to about 15 wt % based on a total weight of the composition.

The initiator included in the composition is a compound that initiates a radical polymerization of the monomer and/or a thiol compound (that will be described later) by energy (e.g., heat or light). The initiator may include a thermal initiator and/or a photoinitiator. Types of the thermal initiator may include azobisisobutyronitrile, and the like, but are not limited thereto. The photoinitiator may include a triazine compound, an acetophenone compound, a benzophenone compound, a thioxanthone compound, a benzoin compound, an oxime ester compound, an aminoketone compound, a phosphine or phosphine oxide compound, a carbazole compound, a diketone compound, a sulfonium borate compound, a diazo compound, a biimidazole compound, or a combination thereof, but is not limited thereto. Types of each initiator are known and are not particularly limited.

In the ink composition, an amount of the initiator may be greater than or equal to about 0.01 wt %, for example, greater than or equal to about 0.1 wt %, or greater than or equal to about 1 wt % and less than or equal to about 15 wt %, for example, less than or equal to about 10 wt %, or less than or equal to about 5 wt %, based on a total solid content.

The composition includes a liquid vehicle. The liquid vehicle includes a mixture of a first organic compound and a second organic compound.

In forming the quantum dot-polymer composite film or pattern, development of a composition applicable for an inkjet printing is needed. The inkjet printing for forming the quantum dot-polymer composite film or pattern provides a highly precise pattern without a separate development process, and thus an undercut or shape defect of the pattern may be decreased. In addition, the inkjet printing may reduce a consumption of a material (particularly, a quantum dot) and a total manufacture cost, provide a pattern including an increased amount of quantum dots and a light scatterer (which is described later) (e.g., a titanium dioxide particle and the like), easily adjust (or increase) a pattern thickness, and thus provide a pattern having a thickness of greater than or equal to about 8 micrometers and satisfactory shape characteristics. In addition, the pattern may be formed to have a large area with a reduced number of processes. However, in order to achieve this a composition having an inkjet shot precision without nozzle clogging is required.

The ink composition including a liquid vehicle having a post-described mixture may contribute to solving the above technical problem. The ink composition may not show gelation or cloudiness. The ink composition including a liquid vehicle having the mixture, which is described later, may be sprayed by using an inkjet printing system without nozzle clogging. The ink composition may not be dried during discharge in the inkjet printing system and thus stably discharged. The ink composition is discharged on a substrate at room temperature and heated to form a quantum dot-polymer composite film, and herein, a uniform film or pattern may be formed without a phase-separation. The above liquid vehicle has a relatively high boiling point (e.g., greater than or equal to 190° C. or greater than or equal to 200° C.), and accordingly, the composition may have a desired viscosity with a required solid content. In addition, the above liquid vehicle may maintain an appropriate vapor pressure (e.g., less than or equal to 1 mm Hg at 20° C.) to prevent the formation of a solid precipitate, while the composition is discharging from the inkjet printing system, or after discharging. In addition, the liquid vehicle having the post-described mixture may show a desired surface tension.

The ink composition may have a vapor pressure at 180° C. of less than or equal to about 400 mm Hg, less than or equal to about 390 mm Hg, less than or equal to about 380 mm Hg, less than or equal to about 370 mm Hg, less than or equal to about 360 mm Hg, less than or equal to about 350 mm Hg, less than or equal to about 345 mm Hg, or less than or equal to about 340 mm Hg. The composition may have a vapor pressure at 180° C. of less than or equal to about 340 mm Hg. The first organic compound may have a surface tension at 25° C. of less than or equal to about 36 mN/m, or less than or equal to about 32 mN/m.

In the liquid vehicle, the first organic compound may include an organic solvent capable of dispersing quantum dots without adversely affecting properties. The first organic compound may be selected in consideration of an organic ligand on a surface of the quantum dots. The first organic compound may have a boiling point of greater than or equal to about 177° C., greater than or equal to about 180° C., greater than or equal to about 190° C., greater than or equal to about 200° C., or greater than or equal to about 210° C. The first organic compound may have a boiling point of less than or equal to about 250° C., less than or equal to about 245° C., less than or equal to about 240° C., less than or equal to about 235° C., less than or equal to about 230° C., less than or equal to about 225° C., less than or equal to about 220° C., less than or equal to about 219° C., less than or equal to about 218° C., less than or equal to about 217° C., less than or equal to about 216° C., or less than or equal to about 215° C.

In an embodiment, the first organic compound includes a compound represented by Chemical Formula 1, a compound represented by Chemical Formula 2, or a combination thereof:

A-L-ester-R    Chemical Formula 1 wherein, in Chemical Formula 1, A is an alicyclic hydrocarbon group having a carbon number of 5 or greater (e.g., a substituted or unsubstituted cyclohexyl group) or a branched hydrocarbon group having a carbon number of 5 or greater (e.g., a substituted or unsubstituted alkyl group, alkenyl group, or alkynyl group), L is a single bond or a substituted or unsubstituted C1 to C10 alkylene group, the ester is COO or OCO, and each instance of R is the same or different and is independently a C1 to C10 substituted or unsubstituted aliphatic hydrocarbon group (e.g., a linear or branched C1 to C10 alkyl group or alkenyl group);

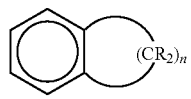

Chemical Formula 2 wherein, in Chemical Formula 2, n is 6 to 10, and R is hydrogen or a C1 to C3 alkyl group.

The first organic compound may include a compound represented by Chemical Formula 1-1, an acetate having a branched C6 or more alkyl group (e.g., ethylhexyl group, etc.), benzocyclohexane, benzocycloheptane, benzocyclooctane, or a combination thereof:

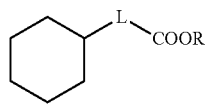

Chemical Formula 1-1 wherein, in Chemical Formula 1-1, L is a single bond or a C1 to C3 substituted or unsubstituted alkylene group (e.g., methylene, ethylene, or propylene), and R is a C1 to C3 alkyl group (e.g., methyl, ethyl, or propyl).

The first organic compound may be alkyl cyclohexanecarboxylate. In an embodiment, the first organic compound may include methyl cyclohexylacetate (CAS Number 14352-61-5, a boiling point of 200° C.), ethyl cyclohexylacetate (CAS Number 5452-75-5, a boiling point of 211° C.), propylcyclohexanecarboxylate (6739-34-0, a boiling point of 214° C.), isopropylcyclohexanecarboxylate, cyclohexyl butyrate (CAS Number 1551-44-6, boiling point of 200° C.), methyl cyclohexane carboxylate (CAS Number 4630-82-4, a boiling point of 180° C.), ethylhexylacetate, benzocyclohexane, benzocycloheptane, benzocyclooctane, or a combination thereof.

In an embodiment, the liquid vehicle may not include cyclohexyl acetate, an ester compound including a hydroxy aromatic group (e.g., ethylhexyl salicylate), phenoxytoluene, alkyltoluene, cyclohexylbenzene, alkyl phenyl ether, or a combination thereof.

The second organic compound includes a compound represented by Chemical Formula 3, a compound represented by Chemical Formula 4, or a combination thereof:

$R^1$—COO—$[C_nR_{2n+1}O]_m$—$R^2$    Chemical Formula 3 wherein, in Chemical Formula 3, $R^1$ and $R^2$ are the same or different and are independently a C1 to C20 alkyl group, n is an integer of 1 to 3, m is an integer of 1 to 10, and each instance of R is the same or different and is independently hydrogen or a C1 to C10 alkyl group,

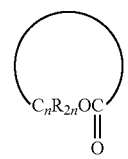

Chemical Formual 4 wherein, in Chemical Formula 4, each instance of R is the same or different and is independently hydrogen, a C1 to C10 alkyl group, or a C1 to C10 acyl group, and n is an integer ranging from 3 to 6.

The compound represented by Chemical Formula 3 may include propylene glycol monomethyl ether acetate (PG-MEA), dipropylene glycol methyl ether acetate, 2-(2-butoxyethoxy)ethyl acetate, 2-butoxyethyl acetate, or a combination thereof.

The compound represented by Chemical Formula 4 may include gamma-butyrolactone, 2-acetylbutyrolactone, or a combination thereof.

In the liquid vehicle, the second organic compound include an organic solvent that may disperse/dissolve the insulating polymer precursor, the binder, the radical initiator, the metal oxide particulate, or other components in the ink composition and may not cause cloudiness or gelation when mixed with the first organic compound (e.g., in which a plurality of quantum dots are dispersed). The second organic compound may have a boiling point of greater than or equal to about 190° C., greater than or equal to about 191° C., greater than or equal to about 192° C., greater than or equal to about 193° C., greater than or equal to about 194° C., greater than or equal to about 195° C., greater than or equal to about 196° C., greater than or equal to about 197° C., greater than or equal to about 198° C., greater than or equal to about 199° C., or greater than or equal to about 200° C. The second organic compound may have a vapor pressure at 20° C. of less than or equal to about 2 mm Hg, less than or equal to about 1.6 mm Hg, less than or equal to about 1 mm Hg, less than or equal to about 0.5 mm Hg, less than or equal to about 0.4 mm Hg, less than or equal to about 0.3 mm Hg, less than or equal to about 0.2 mm Hg, or less than or equal to about 0.1 mm Hg. The second organic compound may have a surface tension at 23° C. of greater than or equal to about 27 mN/m.

The second organic compound may include a combination of the compound represented by Chemical Formula 3 and the compound represented by Chemical Formula 4.

The second organic compound may include propylene glycol monomethyl ether acetate (PGMEA), dipropylene glycol methyl ether acetate, gamma-butyrolactone, 2-(2-butoxyethoxy)ethyl acetate, 2-butoxyethyl acetate, 2-acetyl-butyrolactone, or a combination thereof.

An amount of the first organic compound may be greater than or equal to about 40 wt %, greater than or equal to about 45 wt %, greater than or equal to about 50 wt %, greater than or equal to about 55 wt %, greater than or equal to about 60 wt %, or greater than or equal to about 65 wt % based on a total weight of the liquid vehicle.

The amount of the first organic compound may be less than 100 wt %, for example, less than or equal to about 95 wt %, less than or equal to about 90 wt %, less than or equal to about 85 wt %, less than or equal to about 80 wt %, less than or equal to about 75 wt %, less than or equal to about 70 wt %, less than or equal to about 65 wt %, or less than or equal to about 60 wt % based on a total weight of the liquid vehicle.

An amount of the second organic compound may be greater than 0 wt %, for example, greater than or equal to about 5 wt %, greater than or equal to about 10 wt %, greater than or equal to about 15 wt %, greater than or equal to about 20 wt %, greater than or equal to about 25 wt %, greater than or equal to about 30 wt %, or greater than or equal to about 35 wt % based on a total weight of the liquid vehicle.

The amount of the second organic compound may be less than or equal to about 60 wt %, less than or equal to about 55 wt %, less than or equal to about 50 wt %, less than or equal to about 45 wt %, less than or equal to about 40 wt %, less than or equal to about 35 wt %, less than or equal to about 30 wt %, less than or equal to about 25 wt %, less than or equal to about 20 wt %, less than or equal to about 15 wt %, less than or equal to about 10 wt %, or less than or equal to about 5 wt % based on a total weight of the liquid vehicle.

When the liquid vehicle includes propylene glycol monomethyl ether acetate (PGMEA), and optionally, an additional second organic compound of Chemical Formula 3 and/or Chemical Formula 4 (except PGMEA), an amount of the propylene glycol monomethyl ether acetate may be less than or equal to about 20 wt %, less than or equal to about 15 wt %, less than or equal to about 14 wt %, less than or equal to about 13 wt %, less than or equal to about 12 wt %, less than or equal to about 11 wt %, less than or equal to about 10 wt %, less than or equal to about 9 wt %, less than or equal to about 8 wt %, less than or equal to about 7 wt %, less than or equal to about 6 wt %, less than or equal to about 5 wt %, less than or equal to about 4 wt %, less than or equal to about 3 wt %, less than or equal to about 2 wt %, or less than or equal to about 1 wt % based on a total weight of the liquid vehicle. In another embodiment, the liquid vehicle or the second organic compound may not include PGMEA.

The ink composition may have a viscosity at 25° C. of greater than or equal to about 6.0 cPs, greater than or equal to about 6.1 cPs, greater than or equal to about 6.2 cPs, greater than or equal to about 6.3 cPs, greater than or equal to about 6.4 cPs, greater than or equal to about 6.5 cPs, greater than or equal to about 6.6 cPs, greater than or equal to about 6.7 cPs, greater than or equal to about 6.8 cPs, greater than or equal to about 6.9 cPs, or greater than or equal to about 7.0 cPs. The ink composition may have a viscosity at 25° C. of less than or equal to about 8.5 cPs, less than or equal to about 8.4 cPs, less than or equal to about 8.3 cPs, less than or equal to about 8.2 cPs, less than or equal to about 8.1 cPs, less than or equal to about 8.0 cPs, less than or equal to about 7.9 cPs, less than or equal to about 7.8 cPs, less than or equal to about 7.7 cPs, less than or equal to about 7.6 cPs, less than or equal to about 7.5 cPs, less than or equal to about 7.4 cPs, less than or equal to about 7.3 cPs, less than or equal to about 7.2 cPs, less than or equal to about 7.1 cPs, less than or equal to about 7.0 cPs, less than or equal to about 6.9 cPs, less than or equal to about 6.8 cPs, less than or equal to about 6.7 cPs, less than or equal to about 6.6 cPs, or less than or equal to about 6.5 cPs.

The ink composition may have a surface tension at 23° C. of greater than or equal to about 21 mN/m, greater than or equal to about 22 mN/m, greater than or equal to about 23 mN/m, greater than or equal to about 24 mN/m, greater than or equal to about 25 mN/m, greater than or equal to about 26 mN/m, greater than or equal to about 27 mN/m, greater than or equal to about 28 mN/m, greater than or equal to about 29 mN/m, greater than or equal to about 30 mN/m, greater than or equal to about 31 mN/m and less than or equal to about 40 mN/m, less than or equal to about 39 mN/m, less than or equal to about 38 mN/m, less than or equal to about 36 mN/m, less than or equal to about 35 mN/m, less than or equal to about 34 mN/m, less than or equal to about 33 mN/m, or less than or equal to about 32 mN/m, while having the viscosity within the previously recited ranges (or a combination thereof). The ink composition may have a surface tension of less than or equal to about 31 mN/m, less than or equal to about 30 mN/m, less than or equal to about 29 mN/m, or less than or equal to about 28 mN/m.

The ink composition may further include a metal oxide particulate. The metal oxide particulate may be non-light emissive.

An average particle size of the metal oxide particulate may be greater than or equal to about 100 nm, for example, greater than or equal to about 150 nm, greater than or equal to about 160 nm, greater than or equal to about 170 nm, greater than or equal to about 180 nm, or greater than or equal to about 190 nm. The average particle size of the metal oxide particulate may be less than or equal to about 1,000 nm, less than or equal to about 900 nm, less than or equal to about 800 nm, less than or equal to about 700 nm, less than or equal to about 600 nm, or less than or equal to about 500 nm. The average particle size of the metal oxide particulate may be from about 100 nm to about 500 nm, about 190 nm to about 450 nm, or about 150 nm to about 300 nm. The size of the metal oxide particulate may be selected in consideration of the amounts of other components in the composition, a film thickness of a composite, and the like.

The metal oxide particulate may include titanium oxide, silicon oxide, barium oxide, zinc oxide, hafnium oxide, zirconium oxide, aluminum oxide, gallium oxide, indium oxide, germanium oxide, tin oxide, antimony oxide, scandium oxide, yttrium oxide, lanthanum oxide, ruthenium oxide, cerium oxide, tantalum oxide, niobium oxide, or a combination thereof. The metal oxide particulate may include $TiO_2$, $SiO_2$, $BaTiO_3$, $Ba_2TiO_4$, $ZnO$, $HfO_2$, $ZrO_2$, $Al_2O_3$, $Ga_2O_3$, $In_2O_3$, $GeO_2$, $SnO_2$, $Sb_2O_3$, $Sc_2O_3$, $Y_2O_3$, $La_2O_3$, $RuO_2$, $CeO_2$, $TaO_2$, $Nb_2O_5$, or a combination thereof.

An amount of the metal oxide particulate may be greater than or equal to about 0.5 wt %, greater than or equal to about 1 wt %, greater than or equal to about 2 wt %, greater than or equal to about 3 wt %, greater than or equal to about 4 wt %, greater than or equal to about 5 wt %, greater than or equal to about 6 wt %, greater than or equal to about 7 wt %, greater than or equal to about 8 wt %, greater than or equal to about 9 wt %, or greater than or equal to about 10 wt % based on total solid contents (TSC). The amount of the metal oxide particulate may be less than or equal to about 60 wt %, less than or equal to about 50 wt %, less than or equal to about 40 wt %, less than or equal to about 35 wt %, less than or equal to about 30 wt %, less than or equal to about 25 wt %, or less than or equal to about 20 wt % based on a total solid content.

The metal oxide particulate may improve luminous efficiency of a quantum dot-polymer composite (or a pattern thereof) prepared from the ink composition. The metal oxide particulate may increase a refractive index of the composition (or composite) and in addition, a path of excited light and possibility of incident light to meet with the quantum dot in the composition (or the composite).

The ink composition according to an embodiment may further include a multiple thiol compound having at least two thiol groups. The multiple thiol compound may be represented by Chemical Formula 5:

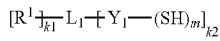

Chemical Formula 5 wherein, in Chemical Formula 5, each instance of $R^1$ is the same or different and is independently hydrogen; a substituted or unsubstituted C1 to C30 linear or branched alkyl group; a substituted or unsubstituted C6 to C30 aryl group; a substituted or unsubstituted C1 to C30 heteroaryl group; a substituted or unsubstituted C3 to C30 cycloalkyl group; a substituted or unsubstituted C2 to C30 heterocycloalkyl group; a C1 to C10 alkoxy group; a hydroxy group; —$NH_2$; a substituted or unsubstituted C1 to C30 amine group (—NRR', wherein R and R' are independently hydrogen or a C1 to C30 linear or branched alkyl group); an isocyanate group; halogen; —ROR' (wherein R is a substituted or unsubstituted C1 to C20 alkylene group, R' is hydrogen or a C1 to C20 linear or branched alkyl group); acyl halide (—RC(=O)X, wherein R is a substituted or unsubstituted alkylene group, X is a halogen); —O(=O)OR' (wherein R' is hydrogen or a C1 to C20 linear or branched alkyl group); —ON; or —OC(=O)NRR' (wherein R and R' are independently hydrogen or a C1 to C20 linear or branched alkyl group), $L_1$ is a carbon atom, a substituted or unsubstituted C1 to C30 alkylene moiety, a substituted or unsubstituted C3 to C30 cycloalkylene moiety, a substituted or unsubstituted C6 to C30 arylene moiety, or a substituted or unsubstituted C1 to C30 heteroarylene moiety, wherein a methylene (—$CH_2$—) included in the substituted or unsubstituted C1 to C30 alkylene group may be replaced by sulfonyl (—$SO_2$—), carbonyl (CO), ether (—O—), sulfide (—S—), sulfoxide (—SO—), ester (—O(=O)O—), amide (—O(=O)NR—) (wherein R is hydrogen or a C1 to C10 alkyl group), or a combination thereof, $Y_1$ is a single bond; a substituted or unsubstituted C1 to C30 alkylene group; a substituted or unsubstituted C2 to C30 alkenylene group; a C1 to C30 alkylene group or a C2 to C30 alkenylene group wherein a methylene (—$CH_2$—) may be replaced by sulfonyl (—S(=O)$_2$—), carbonyl (—C=O), ether (—O—), sulfide (—S—), sulfoxide (—S(=O)—), ester (—O(=O)O—), amide (—O(=O)NR—) (wherein R is hydrogen or a C1 to C10 linear or branched alkyl group), imine (—NR—) (wherein R is hydrogen or a C1 to C10 linear or branched alkyl group), or a combination thereof, m is an integer of 1 or more, k1 is 0 or an integer of 1 or more, k2 is an integer of 1 or more, and the sum of m and k2 is an integer of 3 or more, provided that when $Y_1$ is not a single bond, m does not exceed the valence of $Y_1$, and the sum of k1 and k2 does not exceed the valence of $L_1$.

The multiple thiol compound may include a compound represented by Chemical Formula 5-1:

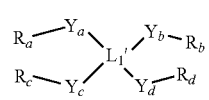

Chemical Formula 5-1 wherein, in chemical formula 5-1, $L_1'$ is carbon, a substituted or unsubstituted C2 to C20 alkylene moiety, a substituted or unsubstituted C6 to C30 arylene moiety; a substituted or unsubstituted C1 to C30 heteroarylene moiety; a substituted or unsubstituted C3 to C30 cycloalkylene moiety; or a substituted or unsubstituted C2 to C30 heterocycloalkylene moiety, $Y_a$ to $Y_d$ are independently a direct bond; a substituted or unsubstituted C1 to C30 alkylene group; a substituted or unsubstituted C2 to C30 alkenylene group; or a C1 to C30 alkylene group or a C2 to C30 alkenylene group wherein a methylene (—$CH_2$—) may be replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 straight or branched alkyl group), imine (—NR—) (wherein R is hydrogen or a C1 to C10 straight or branched alkyl group), or a combination thereof, each of $R_a$ to $R_d$ is independently $R^1$ of Chemical Formula 6 or SH, provided that at least two of $R_a$ to $R_d$ are SH.

The multiple thiol compound may prevent that photoluminescence efficiency of quantum dots, may be dispersed in the pattern obtained by being further reacted with the monomer which will be described later, and/or may be deteriorated by the heat treatment accompanied with the photoresist process without unfavorably influencing on the dispersibility of quantum dots. Without being bound to specific theory, it is considered that the multiple thiol compound is reacted with a monomer which will be described later to provide a (patterned) polymer matrix with a dense network. The multiple thiol compound may make a bond between the quantum dot and the monomer to improve a dispersibility and a stability of quantum dots in the composite. Photoluminescence characteristics (e.g., photoconversion rate maintaining characteristics) of a pattern formed from the ink composition including the multiple thiol compound may be improved.

The multiple thiol compound may be a dithiol compound, a trithiol compound, a tetrathiol compound, or a combination thereof. For example, the multiple thiol compound may be glycol di-3-mercaptopropionate, glycol dimercaptoacetate, trimethylolpropane tris(3-mercaptopropionate), pentaerythritol tetrakis(3-mercaptopropionate), pentaerythritol tetrakis(2-mercaptoacetate), 1,6-hexanedithiol, 1,3-propanedithiol, 1,2-ethanedithiol, poly(ethylene glycol) dithiol including 1 to 10 ethylene glycol repeating units, or a combination thereof.

An amount of the multiple thiol compound may be greater than or equal to about 0.5 wt %, for example, greater than or equal to about 1 wt %, greater than or equal to about 2 wt %, greater than or equal to about 3 wt %, greater than or equal to about 4 wt %, greater than or equal to about 5 wt %, greater than or equal to about 6 wt %, greater than or equal to about 7 wt %, greater than or equal to about 8 wt %, greater than or equal to about 9 wt %, or greater than or equal to about 10 wt % based on a total weight of solid contents in the ink composition. The amount of the multiple thiol compound may be less than or equal to about 55 wt %, for example, less than or equal to about 50 wt %, less than or equal to about 40 wt %, less than or equal to about 35 wt %, less than or equal to about 30 wt %, or less than or equal to about 27 wt % based on a total weight of solid contents. The amount of the multiple thiol compound may be determined in consideration of the patternability and stability.

The ink composition may further include various additives such as a light diffusing agent (excepting the metal oxide particulate), a leveling agent, or a coupling agent in addition to the above components as needed. The amount of the additive is not particularly limited, and may be controlled within an appropriate range wherein the additive does not cause an adverse effect on the ink composition and the pattern obtained therefrom. For example, if it is present, the amount of the additive may be greater than or equal to about 0.001 wt % and less than or equal to about 20 wt % based on a total weight of a solid content, but is not limited thereto.

A total solid content of the ink composition may be greater than or equal to about 20 wt %, for example, greater than or equal to about 25 wt %, greater than or equal to about 30 wt %, less than or equal to about 80 wt % for example, 70 wt %, less than or equal to about 60 wt %, less than or equal to about 50 wt %, less than or equal to about 40 wt %, or less than or equal to about 35 wt %. A total solid content may be selected in consideration of a viscosity, a surface tension, a vapor pressure, and the like.

The method of preparing an ink composition includes dispersing the quantum dot in the first organic compound to prepare quantum dot dispersion; and mixing the quantum dot dispersion with the carboxyl group (—COOH)-containing binder polymer, the insulating polymer precursor (e.g., the monomer), the initiator, and the second organic compound.

The mixing may include dissolving the carboxyl group-containing binder polymer, and optionally, the insulating polymer precursor, the photoinitiator, or a combination thereof in the second organic compound to obtain a second dispersion, and mixing the second dispersion with the quantum dot dispersion. The mixing may be performed simultaneously or sequentially. For example, each component may be mixed sequentially or simultaneously.

The quantum dot, the first organic compound, the carboxyl group-containing binder polymer, the insulating polymer precursor, the initiator, and the second organic compound are the same as described above.

The mixing manner is not particularly limited and may be appropriately selected.

The ink composition according to an embodiment may be deposited on a desired substrate (e.g., to have a desired pattern) by using an appropriate system (e.g., a droplet discharging apparatus such as an inkjet or nozzle printing device), and thus form a highly precise quantum dot-polymer composite film or pattern in a simple method within a short time. Accordingly, a method of manufacturing the quantum dot polymer composite pattern according to an embodiment includes forming a film by depositing the above ink composition on a substrate by using a droplet discharging apparatus, heating the deposited film to remove the liquid vehicle therefrom, and polymerizing the insulating polymer precursor.

A structure of the droplet discharging apparatus is known, and is not particularly limited. The ink composition may be discharged on the substrate through a nozzle of the droplet discharging apparatus to form a film having a predetermined pattern. The nozzle may have an appropriately selected shape and size without a particular limit. The nozzle has a hole (i.e., an orifice) having a diameter of greater than or equal to about 15 µm, for example, greater than or equal to about 20 µm, greater than or equal to about 30 micrometers, greater than or equal to about 40 µm to less than or equal to about 100 µm, for example, less than or equal to about 90 µm, less than or equal to about 80 µm, and less than or equal to about 70 µm, but is not limited thereto. The ink composition according to an embodiment may be sprayed without clogging through an orifice having a diameter of about 40 µm.

The obtained (patterned) film is heated to remove the liquid vehicle and polymerize monomers, and thus form a quantum dot polymer composite film (or a pattern).

The method may form a quantum dot polymer composite pattern without using a mask corresponding to the pattern, and thus provides a thin film using a method with high productivity. In addition, since compositions, each having a different composition, may be discharged from each nozzle, a pattern having repetitive red and green light emitting sections may be obtained by preparing ink compositions respectively emitting light of a different wavelength (e.g., red and green) and discharging them through a plurality of nozzles through a reduced recovery process. In addition, the pattern may be formed without a development process, and thus desirably reduce consumption of a material.

The quantum dot polymer composite film (or pattern) formed from the above ink composition includes an increased amount of quantum dots, and may have, for example, an increased thickness of greater than or equal to about 8 µm, greater than or equal to about 10 µm, and even greater than or equal to about 30 µm.

Accordingly, in another embodiment, the quantum dot-polymer composite pattern includes a matrix including a carboxyl group (—COOH)-containing binder polymer and an insulating polymer; and a plurality of quantum dots dispersed in the matrix, and the quantum dot polymer composite pattern includes greater than or equal to about 45 wt % of quantum dots based on a total weight of the composite, and the quantum dot polymer composite has a thickness of greater than or equal to about 8 µm.

The plurality of quantum dots may be individually distributed in a dispersion phase in the polymer matrix continuous phase. Each component of the composite is the same as described above. The matrix may include a linear polymer and a cross-linked polymer.

In another embodiment, a stack structure may include a substrate; and an emission layer (e.g., photoluminescent layer) disposed on the substrate, wherein the emission layer includes a pattern of the quantum dot-polymer composite and the pattern includes a repetitive section emitting light in a predetermined wavelength. In an embodiment, the pattern of the quantum dot polymer composite includes a repetitive section including a first section emitting first light, a second section emitting second light, or a combination thereof.

The first light and the second light have different maximum photoluminescence peak wavelengths in a photoluminescence spectrum. In an embodiment, the first light may be red light present at a maximum photoluminescence peak wavelength of about 600 nm to about 650 nm (e.g., about 620 nm to about 650 nm), and the second light may be green light present at a maximum photoluminescence peak wavelength of about 500 nm to about 550 nm (e.g., about 510 nm to about 550 nm).

The substrate may be a substrate including an insulating material (e.g., insulating transparent substrate). The substrate may include glass; various polymers such as polyesters (e.g., polyethylene terephthalate (PET), polyethylene naphthalate (PEN)), polycarbonates, polyacrylates, polyimides, and polyamideimides; polysiloxane (e.g. PDMS); inorganic materials such as $Al_2O_3$, ZnO; or a combination thereof, but is not limited thereto. Herein "transparent" refers to transmittance for light in a predetermined wavelength (e.g., light emitted from the quantum dot) of greater than or equal to about 85%, for example, greater than or equal to about 88%, greater than or equal to about 90%, greater than or equal to about 95%, greater than or equal to about 97%, or greater than or equal to about 99%. A thickness of the substrate may be desirably selected in consideration of a substrate material but is not particularly limited. The transparent substrate may have flexibility. The transparent substrate may be an upper substrate of a liquid crystal panel.

The emission layer may further include a third section to emit or transmit third light (e.g., blue light) that is different from the first light and the second light. A maximum peak wavelength of the third light may be greater than or equal to about 380 nm and less than or equal to about 480 nm.

FIG. 1 is a schematic cross-sectional view showing a stack structure 1 according to a non-limiting embodiment. The stack structure shown in FIG. 1 includes a first section 11 emitting red light (R), a second section 21 emitting green light (G), and a third section 31 emitting blue light (B), as well as black matrices 40 disposed between the sections, all of which are formed on a transparent substrate 10.

When the first light is red light, the second light is green light, and the light source is blue light, an optical element to block (e.g., reflect or absorbs) the blue light may be disposed on a front surface (light emitting surface) of the first section and the second section.

The quantum dot polymer composite and the pattern thereof are the same as described above.

In a display device including the above stack structure, the light source may include a plurality of light emitting units respectively corresponding to the first section and the second section, and the light emitting units may include a first electrode and a second electrode facing each other and an electroluminescence layer disposed between the first electrode and the second electrode. The electroluminescence layer may include an organic light emitting material. For example, each light emitting unit of the light source may include an electroluminescent device (e.g., an organic light emitting diode (OLED)) structured to emit light of a predetermined wavelength (e.g., blue light, green light, or a combination thereof). A thin film transistor (TFT) and a substrate (e.g., glass substrate) may be disposed under the OLED and structures and materials of the electroluminescent device and organic light emitting diode (OLED) are known, but not particularly limited.

Figure 2A:
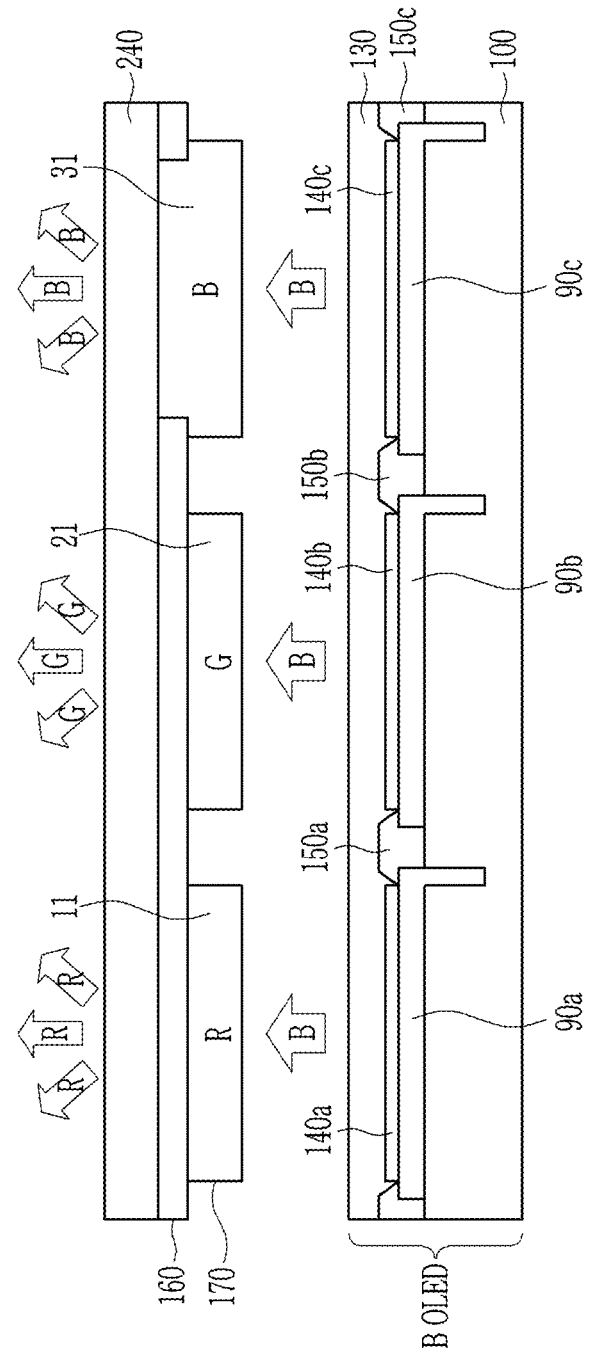
FIGS. 2A and 2B are schematic cross-sectional views showing devices according to non-limiting embodiments.
Figure 2B:
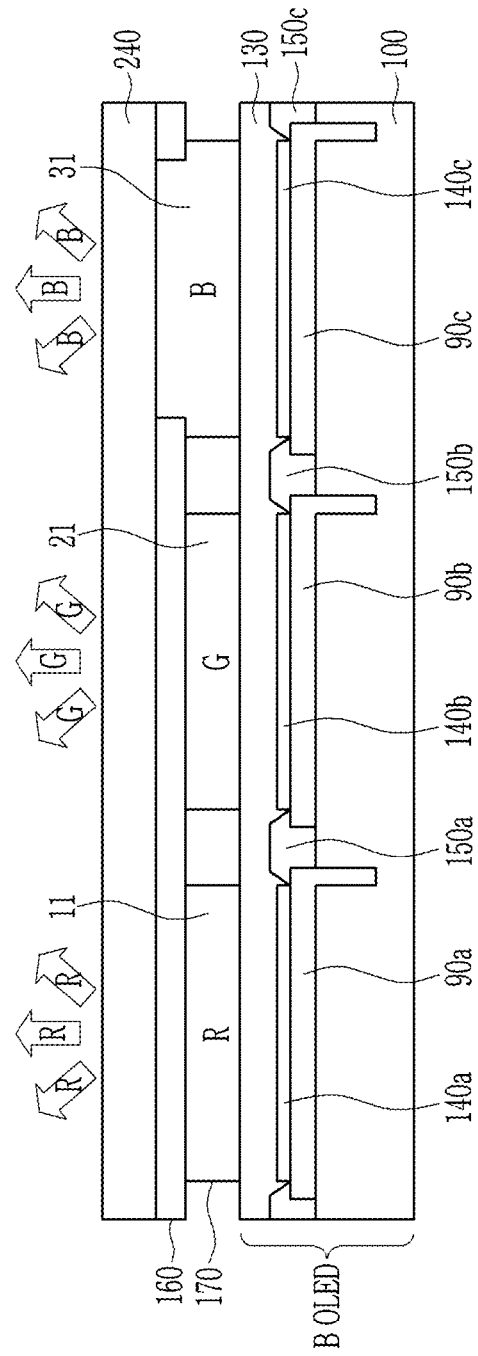

FIGS. 2A and 2B are schematic cross-sectional views showing devices according to exemplary embodiments. Referring to FIGS. 2A and 2B, a light source includes an organic light emitting diode (OLED) emitting blue light.

The organic light emitting diode (OLED) may include at least two pixel electrodes 90a, 90b, and 90c on a substrate 100, pixel define layers 150a, 150b, and 150c formed between neighboring pixel electrodes 90a, 90b, and 90c, organic emission layers 140a, 140b, and 140c on each pixel electrode, and a common electrode 130 layer formed on the organic emission layers.

The substrate 100 may include an insulating material and may have flexibility. Details of the substrate are the same as described above.

A line layer including a thin film transistor or the like is formed on the substrate. The line layer may further include a gate line, a sustain voltage line, a gate insulating layer, a data line, a source electrode, a drain electrode, a semiconductor, a protective layer, and the like. The detail structure of the line layer may be verified according to an embodiment. The gate line and the sustain voltage line are electrically separated from each other, and the data line is insulated and crosses the gate line and the sustain voltage line. The gate electrode, the source electrode, and the drain electrode form a control terminal, an input terminal, and an output terminal of the thin film transistor, respectively. The drain electrode is electrically connected to the pixel electrode that will be described later.

The pixel electrodes 90a, 90b, and 90c may function as an anode of the display device. The pixel electrode may include a transparent conductive material such as indium tin oxide (ITO) or indium zinc oxide (IZO). The pixel electrode may include a material having a light-blocking properties such as gold (Au), platinum (Pt), nickel (Ni), tungsten (W), chromium (Cr), molybdenum (Mo), iron (Fe), cobalt Co), copper (Cu), palladium (Pd), titanium (Ti), and the like. Alternatively, the pixel electrode may have a two-layered structure where the transparent conductive material and the material having light-blocking properties are stacked sequentially.

Between two adjacent pixel electrodes, a pixel define layer (PDL) 150a, 150b, and 150c overlaps with a terminal end of the pixel electrode to divide the pixel electrode into a pixel unit. The pixel define layer is an insulating layer which may electrically block the at least two pixel electrodes.

The pixel define layer covers a part of the upper surface of the pixel electrode, and the remaining region of the pixel electrode that is not covered by the pixel define layer may provide an opening. An organic emission layer 140a, 140b, and 140c which will be described later may be formed on the region defined by the opening.

The organic emission layer 140a, 140b, and 140c defines each pixel area by the pixel electrode and the pixel define layer. In other words, one pixel area may be defined as an area including one organic emission unit layer which is contacted with one pixel electrode divided by the pixel define layer.

For example, in the display device according to an embodiment, the organic emission layer may be defined as a first pixel area, a second pixel area, and a third pixel area, and each pixel area is spaced apart from each other leaving a predetermined interval by the pixel define layer.

The organic emission layer may emit a third light belonging to visible light region or belonging to UV region. That is, each of the first to the third pixel areas of the organic emission layer may emit a third light. In an embodiment, the third light may be a light having the highest energy in the visible light region, for example, blue light. When all pixel areas of the organic emission layer are designed to emit the same light, each pixel area of the organic emission layer may include the same or similar materials or may have the same or similar properties. Thus it may significantly simplify the process of forming the organic emission layer, so that it may be applied to large scale/large area applications. However, the organic emission layer according to an embodiment is not necessarily limited thereto, but the organic emission layer may be designed to emit at least two different lights.

The organic emission layer may include an organic emission unit layer in each pixel area, and each organic emission unit layer may further include an auxiliary layer (e.g., a hole injection layer, a hole transport layer, an electron transport layer, etc.) besides the emission layer.

The common electrode 130 may function as a cathode of the display device. The common electrode may include a transparent conductive material such as indium tin oxide (ITO) or indium zinc oxide (IZO). The common electrode may be formed on the organic emission layer 140a, 140b, and 140c and may be integrated therewith.

A planarization layer or passivation layer (not shown) may be formed on the common electrode. The planarization layer may include an (e.g., transparent) insulating material for providing electrical insulation with the common electrode.

A stack structure is disposed on the light source and the stack structure c includes the pattern of the quantum dot polymer composite (e.g., a first section including a red quantum dot and a second section including a green quantum dot) and a substrate. The blue light emitted from a light source enters the first section and the second section to emit red and green light respectively. The blue light emitted from a light source may transmit the third section.

This device may be manufactured by separately manufacturing the above stack structure and (e.g., blue light-emitting) OLED and then assembling them. Alternatively, the device may be manufactured by directly forming a quantum dot polymer composite pattern on the OLED.

In the device according to an embodiment, an optical element blocking (e.g., reflecting or absorbing) blue light 160 may be disposed on the first section emitting red light and the second section emitting green light. The optical element blocking blue light 160 may include a blue light reflection layer, a blue light absorption layer, or a combination thereof. The optical element blocking blue light 160 may include a blue cut filter, a polymer layer including a yellow dye, or a combination thereof, and the blue light blocking layer may be disposed on a substrate. The blue light blocking layer 160 may be disposed on the first section and the second section between the substrate and the quantum dot-polymer composite pattern. A detailed description of the blue light blocking layer is the same as that of a first optical filter 310 which will be described later.

In another embodiment, the display device may further include a lower substrate, a polarizer disposed under the lower substrate, and a liquid crystal layer disposed between the stack structure and the lower substrate, wherein the stack structure is disposed so that the light emission layer faces the liquid crystal layer. The display device may further include a polarizer between the liquid crystal layer and the emission layer. The light source may further include an LED and optionally, a light guide panel.

Non-limiting examples of the display device (e.g., a liquid crystal display device) according to an embodiment are illustrated with a reference to a drawing. FIG. 3 is a schematic cross sectional view showing a liquid crystal display according to an embodiment. Referring to FIG. 3, the display device of an embodiment includes a liquid crystal panel 200, a polarizer 300 disposed under the liquid crystal panel 200, and a backlight unit (BLU) disposed under the polarizer 300.

The liquid crystal panel 200 includes a lower substrate 210, a stack structure, and a liquid crystal layer 220 disposed between the stack structure and the lower substrate. The stack structure includes a transparent substrate 240 and a photoluminescent layer 230 including a pattern of a quantum dot polymer composite.

The lower substrate 210 (i.e., an array substrate) may be a transparent insulating material substrate. The substrate is the same as described above. A line plate 211 is provided on an upper surface of the lower substrate 210. The line plate 211 may include a plurality of gate lines (not shown) and data lines (not shown) that define a pixel area, a thin film transistor disposed adjacent to a crossing region of gate lines and data lines, and a pixel electrode for each pixel area, but is not limited thereto. Details of such line plates are known and are not particularly limited.

The liquid crystal layer 220 may be disposed on the line plate 211. The liquid crystal layer 220 may include an alignment layer 221 on and under the layer 220 to initially align the liquid crystal material included therein. Details (e.g., a liquid crystal material, an alignment layer material, a method of forming a liquid crystal layer, a thickness of liquid crystal layer, or the like) of the liquid crystal material and the alignment layer are known and are not particularly limited.

A lower polarizer 300 is provided under the lower substrate. Materials and structures of the polarizer 300 are known and are not particularly limited. A backlight unit (e.g., emitting blue light) may be disposed under the polarizer 300. An upper optical element or an upper polarizer 300 may be provided between the liquid crystal layer 220 and the transparent substrate 240, but is not limited thereto. For example, the upper polarizer 300 may be disposed between the liquid crystal layer the photoluminescent layer. A layer for transmitting blue light and recycling may be disposed between the upper polarizer 300 and the photoluminescent layer 230.

The polarizer may be any polarizer that used in a liquid crystal display device. The polarizer may be TAC (triacetyl cellulose) having a thickness of less than or equal to about 200 μm, but is not limited thereto. In another embodiment, the upper optical element may be a coating that controls a refractive index without a polarization function.

The backlight unit includes a light source 110. The light source may emit blue light or white light. The light source may include a blue LED, a white LED, a white OLED, or a combination thereof, but is not limited thereto.

The backlight unit may further include a light guide panel 120. In an embodiment, the backlight unit may be an edge-type lighting. For example, the backlight unit may include a reflector (not shown), a light guide panel (not shown) provided on the reflector and providing a planar light source with the liquid crystal panel 200, and/or an optical sheet (not shown) on the light guide panel, for example, a diffusion plate, a prism sheet, and the like, but is not limited thereto. The backlight unit may not include a light guide panel. In an embodiment, the backlight unit may provide direct lighting. For example, the backlight unit may have a reflector (not shown), and may have a plurality of fluorescent lamps disposed on the reflector at regular intervals, or may have an LED operating substrate on which a plurality of light emitting diodes may be disposed, a diffusion plate thereon, and optionally an optical sheet. Details (e.g., each component of a light emitting diode, a fluorescent lamp, light guide panel, various optical sheets, and a reflector) of such a backlight unit are known and are not particularly limited.

A black matrix 241 is provided under the transparent substrate 240 and has openings and hides a gate line, a data line, and a thin film transistor of the line plate on the lower substrate. For example, the black matrix 241 may have a lattice shape. The photoluminescent layer 230 is provided in the openings of the black matrix 241 and has a quantum dot-polymer composite pattern including a first section (R) configured to emit first light (e.g., red light), a second section (G) configured to emit second light (e.g., green light), and a third section (B) configured to emit/transmit, for example blue light. Optionally, the photoluminescent layer may further include a fourth section. The fourth section may include a quantum dot that emits different color from light emitted from the first to third sections (e.g., cyan, magenta, and yellow light).

In the photoluminescent layer 230, sections forming a pattern may be repeated corresponding to pixel areas formed on the lower substrate. A transparent common electrode 231 may be provided on the photoluminescent color filter layer.

The third section (B) configured to emit/transmit blue light may be a transparent color filter that does not change a light emitting spectrum of the light source. In this case, blue light emitted from the backlight unit may enter in a polarized state and may be emitted through the polarizer and the liquid crystal layer as it is. Optionally, the third section may include a quantum dot emitting blue light.

Figure 4:
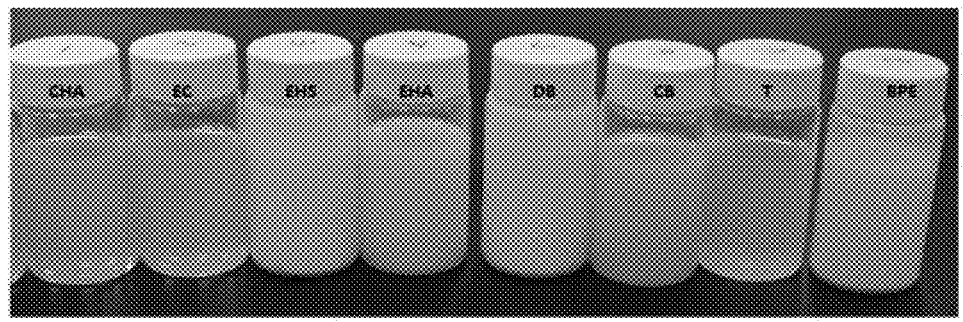
FIG. 4 shows photographs of the ink compositions prepared in the Examples and Comparative Examples.

Optionally, the display device may further have a blue light blocking layer (blue filter) or a first optical filter 310 layer. The blue light blocking layer may be disposed between lower surfaces of the first section (R) and the second section (G) and the upper substrate 240 or on the upper surface of the upper substrate 240. The blue light blocking layer may be a sheet having an opening in a region corresponding to a pixel area (a third section) displaying blue and thus formed in a region corresponding to the first and second sections. That is to say, the first optical filter layer may be disposed at the positions except the position overlapped with the third section and integrally therewith as shown in FIG. 4, but is not limited thereto. For example, at least two first optical filter 310 layers may be disposed leaving a space at each position overlapped with the first and second sections.

The first optical filter layer may block light having, for example, a predetermined wavelength region in the visible light region and may transmit light in the other wavelength regions, and, for example, it may block blue light and may transmit light except the blue light. For example, it may transmit green light, red light, and/or yellow which is a mixed color thereof.

The first optical filter layer may substantially block, for example, blue light at less than or equal to about 500 nm, and may have a property to transmit the remaining visible light in a wavelength region of greater than about 500 nm and less than or equal to about 700 nm.

For example, the first optical filter layer may have a light transmittance of greater than or equal to about 70%, greater than or equal to about 80%, greater than or equal to about 90%, or even about 100% for the visible light in a wavelength region of greater than or equal to 500 nm and less than or equal to about 700 nm.

The first optical filter layer may be a polymer thin film including a dye and/or a pigment that absorbs a light to be blocked, and may absorb a blue light, for example, having a wavelength of about less than or equal to about 480 nm, as much as greater than or equal to about 80%, greater than or equal to about 90%, or even greater than or equal to about 95%, but may have a light transmittance of greater than or equal to about 70%, greater than or equal to about 80%, greater than or equal to about 90%, and even about 100% to the visible light having a wavelength of greater than about 500 nm and less than or equal to about 700 nm.

The first optical filter layer may substantially block (e.g., absorb) blue light having a wavelength of less than or equal to about 500 nm by absorbing the same, and it may selectively transmit, for example, green light, or red light. In this case, at least two first optical filter layers may be disposed with spacing apart at each position which is overlapped with each of the first to second sections. For example, the first optical filter layer selectively transmitting red light may be disposed in a position which is overlapped with the red light emitting section, and the first optical filter layer selectively transmitting green light may be disposed on a position which is overlapped with the green light emitting section. For example, the first optical filter layer may include a first region to block (e.g., absorb) blue light and red light and to selectively transmit light in a predetermined range (e.g., greater than or equal to about 500 nm, greater than or equal to about 510 nm, greater than or equal to about 515 nm, and less than or equal to about 550 nm, for example, less than or equal to about 545 nm, less than or equal to about 540 nm, less than or equal to about 535 nm, less than or equal to about 530 nm, less than or equal to about 525 nm, or less than or equal to about 520 nm), and a second region to block (e.g., absorb) blue light and green light and to selectively transmit light in a predetermined range (e.g., greater than or equal to about 600 nm, greater than or equal to about 610 nm, or greater than or equal to about 615 nm and less than or equal to about 650 nm, less than or equal to about 645 nm, less than or equal to about 640 nm, less than or equal to about 635 nm, less than or equal to about 630 nm, less than or equal to about 625 nm, or less than or equal to about 620 nm). The first region may be disposed at a position overlapped with the green light emitting section and the second region may be disposed at a position overlapped with the red light emitting section. The first region and the second region may optically be isolated. Such a first optical filter layer may contribute to improvement of color purity of the display device.

The first optical filter layer may be a reflective filter including a plurality of layers (e.g., inorganic material layer) having different refractive indexes and for example, it may be formed by alternatively stacking two layers having different refractive indexes, for example, by alternatively stacking a layer having a high refractive index and a layer having a low refractive index. As a refractive index difference between the layer having a high refractive index and the layer having a low refractive index is higher, the provided first optical filter layer has the higher selectivity to a wavelength. A thickness and the stacked number of the layers having a high refractive index and the layers having a low refractive index may be determined according to a refractive index of each layer and a reflected wavelength, for example, each layer having a high refractive index may have a thickness of about 3 nm to about 300 nm, and each layer having a low refractive index may have a thickness of about 3 nm to about 300 nm.

The total thickness of the first optical filter layer may be, for example, from about 3 nm to about 10,000 nm, about 300 nm to about 10,000 nm, or about 1,000 nm to about 10,000 nm. All layers having a high refractive index may have the same thickness and the same material, or different from each other, and all layers having a low refractive index may have the same thickness and the same material, or different from each other.

The display device may further include a second optical filter layer (e.g., a red/green or yellow light recycle layer) 311 disposed between the light emission layer and the liquid crystal layer (e.g., the light emission layer and the upper polarizer), transmitting at least a part of third light, and reflecting at least a part of the first light and/or second light. The second optical filter layer 311 may reflect light in a wavelength region of greater than about 500 nm. The first light may be red light, the second light may be green light, and the third light may be blue light.

In the display device according to an embodiment, the second optical filter layer may be formed as an integrated layer having a relatively planar surface.

In an embodiment, the second optical filter layer may include a monolayer having a low refractive index, for example, it may be a transparent thin film having a refractive index of less than or equal to about 1.4, less than or equal to about 1.3, or less than or equal to about 1.2.

The second optical filter layer having a low refractive index may be, for example, a porous silicon oxide, a porous organic material, a porous organic/inorganic composite, or a combination thereof.

In an embodiment, the second optical filter layer may include a plurality of layers having different refractive indexes, for example, it may be formed by alternatively stacking two layers having different refractive indexes, or for example, it may be formed by alternatively stacking material having a high refractive index and material having a low refractive index.

The layer having a high refractive index in the second optical filter layer may include, for example, hafnium oxide, tantalum oxide, titanium oxide, zirconium oxide, magnesium oxide, cesium oxide, lanthanum oxide, indium oxide, niobium oxide, aluminum oxide, silicon nitride, or a combination thereof, but according to embodiments, it may include a variety of materials having a higher refractive index than the layer having a low refractive index.

The layer having a low refractive index in the second optical filter layer may include, for example, a silicon oxide, but according to embodiments, it may include a variety of materials having a lower refractive index than the layer having a high refractive index.

As the refractive index difference between the layer having a high refractive index and the layer having a low refractive index is the higher, the second optical filter layer may have the higher wavelength selectivity.

In the second optical filter layer, each thickness of the layer having a high refractive index and the layer having a low refractive index and the stacked number thereof may be determined depending upon a refractive index of each layer and the reflected wavelength, for example, each layer having a high refractive index in the second optical filter layer may have a thickness of about 3 nm to about 300 nm, and each layer having a low refractive index in the second optical filter layer may have a thickness of about 3 nm to about 300 nm. The total thickness of the second optical filter layer may be, for example, about 3 nm to about 10,000 nm, about 300 nm to about 10,000 nm, or about 1,000 nm to about 10,000 nm. Each of the layer having a high refractive index and the layer having a low refractive index in the second optical filter layer may have the same thickness and materials, or different thickness and materials from each other.

The second optical filter layer may reflect at least a part of the first light (R) and the second light (G) and may transmit at least a part (e.g., whole part) of the third light (B). For example, the second optical filter layer may transmit only the third light (B) in a blue light wavelength region having a wavelength of less than or equal to about 500 nm, and the light in a wavelength region of greater than about 500 nm, which is green light (G), yellow light, red light (R), or the like, may not be passed through the second optical filter layer and reflected. The reflected green light and red light may pass through the first and second sections and to be emitted to the outside of the display device.

The second optical filter layer may reflect light in a wavelength region of greater than about 500 nm in greater than or equal to about 70%, greater than or equal to about 80%, or greater than or equal to about 90%, or even about 100%.

Meanwhile, the second optical filter layer may have a transmittance to light in a wavelength region of less than or equal to about 500 nm of, for example, greater than or equal to about 90%, greater than or equal to about 92%, greater than or equal to about 94%, greater than or equal to about 96%, greater than or equal to about 98%, greater than or equal to about 99%, or even about 100%.

Hereinafter, the embodiments are illustrated in more detail with reference to examples. However, they are exemplary examples of the present disclosure, and the present disclosure is not limited thereto.

EXAMPLES

Analysis Method

[1] UV-Vis Spectroscopy Analysis

An AGILENT Cary 5000 spectrometer is used to perform a UV spectroscopy analysis and obtain an UV-Visible absorption spectrum.

[2] Photoluminescence Analysis

A HITACHI F-7000 spectrometer is used to obtain a photoluminescence (PL) spectrum of a produced quantum dot at a wavelength of 450 nm.

[3] Photo Efficiency and Photo-Conversion Rate

For a photo-conversion rate of the quantum dot-polymer composite film, a PL spectrum of excited light and a PL spectrum of the quantum dot are obtained by using QE 2100 of Otsuka Electronics Co. Ltd. The total light dose (B) of excited light is obtained from the PL spectrum of excited light, a dose (A) of light in a green or red wavelength emitted from the quantum dot composite film and a dose (B') of excited light are obtained, and a photo-conversion rate is obtained by the following equation.

$$A/(B-B')\times 100 = \text{photo-conversion rate (\%)}$$

A/B is photo efficiency, (B−B')/B is a blue light absorption rate, and the photo-conversion rate represents a ratio of quantum efficiency relative to a blue light absorption rate.

[4] Viscosity of Composition

Viscosity of the composition is measured at 23.1° C. at a shear rate of 0.1/s to 10/s by increasing 0.5/s, by using a Discovery Hybrid Rheometer made by TA Instruments. Herein, the viscosity is measured by using a cone plate as a geometry with a gap of 0.052 mm.

[5] Surface Tension of Composition

A contact angle of a composition is measured by using a contact angle measurement apparatus (Model No. DSA100S) made by Kruss, and surface tension is calculated through the Owens-Wendt formula. Herein, DI water and diiodomethane solution, which are the most easily measured and provide precise measurement values, are used for analysis.

$$\gamma_{SL} = \gamma_S + \gamma_{LV} - 2(\gamma_S^d \gamma_{LV}^d)^{1/2} - 2(\gamma_S^p \gamma_{LV}^p)^{1/2}$$

[4] Vapor Pressure of Composition (Liquid Vehicle)

A vapor pressure of a composition is measured at a predetermined temperature by using MINIVAP VPXpert made by Grabner Instruments.

Reference Example 1: Preparation of Red Light Emitting Non-Cadmium Quantum Dot (1) 0.2 mmol of indium acetate, 0.6 mmol of palmitic acid, and 10 mL of 1-octadecene are put in a reactor and heated to 120° C. under vacuum. After one hour, an atmosphere in the reactor is converted into nitrogen. The reactor is heated up to 280° C., and a mixed solution of 0.1 mmol of tris(trimethylsilyl)phosphine ($TMS_3P$) and 0.5 mL of trioctylphosphine is rapidly injected thereto, and the obtained mixture is reacted for 20 minutes. The reactor is rapidly cooled down to room temperature, acetone is added to the cooled reaction solution, a precipitate is obtained by centrifuging the obtained mixture, and the obtained precipitate is dispersed in toluene.

0.3 mmol (0.056 g) of zinc acetate, 0.6 mmol (0.189 g) of oleic acid, and 10 mL of trioctylamine are put in a reaction flask and vacuum-treated at 120° C. for 10 minutes. The inside of the reaction flask is substituted with $N_2$, and then the flask is heated up to 220° C. A toluene dispersion (OD: 0.15) of the InP semiconductor nanocrystal and a small amount of S/TOP are put into the reaction flask, and then, heated up to 280° C. and reacted for 30 minutes. When the reaction is complete, the reaction solution is rapidly cooled down to room temperature to obtain a reaction product including InP/ZnS semiconductor nanocrystals.

(2) An excess of ethanol is added to the reaction product including the InP/ZnS semiconductor nanocrystal, and then, the mixture is centrifuged. After the centrifuging, a supernatant is removed therefrom, and a precipitate therein is dried to obtain a quantum dot. According to the UV-Vis absorption analysis and light emitting analysis of the quantum dot, the quantum dot absorbs light at a wavelength of 560 nm to 590 nm and emits red light at a wavelength of 600 nm to 650 nm. The quantum dot shows quantum efficiency of 90%.

Example 1

[1] A quantum dot solution is prepared by dispersing the quantum dot powder according to Reference Example 1 in ethylcyclohexane acetate (EC) of the following structure.

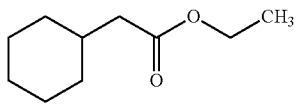

The quantum dot solution is mixed with a binder (a copolymer of methacrylic acid, benzyl methacrylate, hydroxyethyl methacrylate, and styrene, of which the acid value is 130 mg KOH/g, molecular weight is 8,000 g/mol, and the mole ratio of the methacrylic acid:benzyl methacrylate:hydroxyethyl methacrylate:styrene is 61.5%:12%:16.3%:10.2%) solution (solid content of 30 wt % in propylene glycol monomethyl ether acetate (PGMEA)), and subsequently, with the hexacrylate of the following structure as a monomer, an oxime ester compound as an initiator, and $TiO_2$ as a light diffusing agent are added thereto to prepare an ink composition:

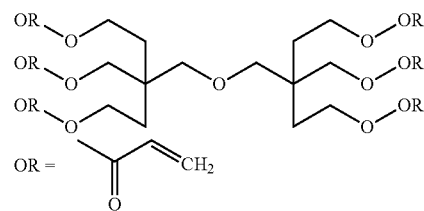

Based on a total solid content of the ink composition, the quantum dot is included in an amount of 50 wt %, the binder is included in an amount of 34 wt %, the monomer is included in an amount of 6 wt %, the initiator is included in an amount of 2 wt %, and $TiO_2$ is included in an amount of 8.3 wt %, and the ink composition also includes a liquid vehicle in an amount of 75 wt %, and in the liquid vehicle, each amount of EC and PGMEA satisfies the above range.

A vapor pressure of the ink composition at 20° C. and 180° C., a surface tension of the ink composition at 23° C., and viscosity of the composition are measured, and the results are shown in Table 1.

[2] A photograph of the prepared ink composition is shown in FIG. 4. Referring to the result of FIG. 4, the ink composition is neither gelled nor cloudy.

[3] The ink composition is spin-coated on a glass substrate, and a resulting material therefrom is treated at 180° C. for 30 minutes to obtain a quantum dot-polymer composite. Photoluminescence characteristics (PLQY, a photoluminescence wavelength, FWHM, and the like) and a photo-conversion rate of the quantum dot-polymer composite are measured and shown in Table 2.

[4] The ink composition is discharged on a glass substrate through an inkjet system at room temperature. The obtained resulting material is heated at 180° C. to obtain a pattern of the quantum dot-polymer composite (a thickness: 10 μm). The ink composition forms the pattern through the inkjet system without clogging a nozzle.

Example 2

[1] An ink composition is prepared by using the same method as in Example 1 except for dispersing the quantum dot powder of Reference Example 1 in benzocyclohexane (T) of the following structure to obtain a quantum dot solution:

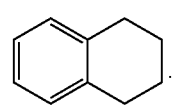

A vapor pressure of the ink composition at 20° C. and 180° C., a surface tension of the ink composition at 23° C., and viscosity of the composition are measured, and the results are shown in Table 1.

Based on a total solid content of the ink composition, the quantum dot is included in an amount of 50 wt %, the binder is included in an amount of 34 wt %, the monomer is included in an amount of 6 wt %, the initiator is included in an amount of 2 wt %, and $TiO_2$ is included in an amount of 8.3 wt %, and the composition also includes 75 wt % of a liquid vehicle, and each amount of T and PGMEA in the liquid vehicle satisfies the above range.

[2] A photograph of the ink composition is shown in FIG. 4. Referring to the result of FIG. 4, the ink composition is neither gelled nor cloudy.

[3] A quantum dot-polymer composite is obtained by using the same method as Example 1 except for using the obtained ink composition.

[4] The quantum dot-polymer composite is discharged on a glass substrate at room temperature through an inkjet system. A resulting material therefrom is heated at 180° C. to obtain a pattern of the quantum dot-polymer composite (thickness: 10 μm). The quantum dot-polymer composite forms the pattern through the inkjet system without clogging a nozzle.

A photo-conversion rate of the quantum dot-polymer composite is measured, and the result is shown in Table 2.

Comparative Example 1

[1] An ink composition is prepared according to the same method as Example 1 except for dispersing the quantum dot powder according to Reference Example 1 in cyclohexylacetate (CHA) to obtain a quantum dot solution. A vapor pressure of the ink composition at 20° C. and 180° C., a surface tension of the ink composition at 23° C., and viscosity of the composition are measured, and the results are shown in Table 1.

[2] A photograph of the ink composition is shown in FIG. 4. Referring to the result of FIG. 4, the ink composition is neither gelled nor cloudy.

[3] A quantum dot-polymer composite is obtained by using the same method as Example 1 except for using the obtained ink composition. A photo-conversion rate of the quantum dot polymer composite is measured and shown in Table 2.

[4] The quantum dot polymer composite is discharged on a substrate at room temperature through an inkjet system. When discharged with a nozzle having an orifice with a diameter of 40 μm, the nozzle is clogged.

TABLE 1

| Properties | | Example 1 | Example 2 | Comparative Example 1 |
|---|---|---|---|---|
| Boiling point | | 177 | 211 | 206 |
| Vapor pressure [mmHg] | 20° C. | 1 | 0.13 | 0.18 |
| | 180° C. | 826 | 306 | 357 |
| Surface tension (23° C., mN/m) | | 30.6 | 31.8 ± 3.0 | 35.9 |
| Viscosity (cPs) | | 5.8 | 6.2 | 6.7 |

TABLE 2

| Characteristics | Example 1 | Example 2 | Comparative Example 1 |
|---|---|---|---|
| Photo-conversion rate (%) | 28.7% | 28.2% | 26.9% |
| Wavelength (nm) | 540 | 540 | 541 |
| Full width at half maximum (FWHM) (nm) | 36 | 36 | 36 |
| Quantum efficiency (%) | 81 | 81 | 75 |

Referring to the above results, the compositions of the Examples show a quantum dot-polymer composite having similar photoluminescence characteristics to those of the Comparative Example.

Comparative Examples 2 to 7

[1] Each ink composition is prepared according to the same method as Example 1 except for obtaining each quantum dot solution by respectively dispersing the quantum dot powder of Reference Example 1 in 2-ethylhexyl salicylate (EHS, Comparative Example 2), 2-ethylhexyl acetate (EHA, Comparative Example 3), 3-phenoxytoluene (PT, Comparative Example 4), dodecylbenzene (DB, Comparative Example 5), cyclohexylbenzene (CB, Comparative Example 6), and butyl phenyl ether (BPE, Comparative Example 7). In Comparative Example 4 (3-phenoxytoluene), a quantum dot dispersion failed to form.

[2] A photograph of a part of the prepared ink compositions is shown in FIG. 4. Referring to FIG. 4, the ink compositions prepared by mixing a monomer, a binder, and the like, are cloudy or gelled.

Example 3

[1] An ink composition is prepared according to the same method as Example 1 except for dispersing the quantum dot powder of Reference Example 1 in cyclohexylacetate (CHA) to obtain a quantum dot solution and adding dipropylene glycol methyl ether acetate (DPMA) having the following chemical formula thereto:

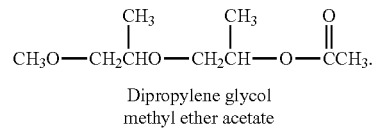

Dipropylene glycol methyl ether acetate

Based on a total solid content of the ink composition, the quantum dot is included in an amount of 55 wt %, the binder is included in an amount of 31 wt %, the monomer is included in an amount of 4 wt %, the initiator is included in an amount of 2 wt %, and $TiO_2$ is included in an amount of 8.3 wt %, and the ink composition also includes 75 wt % of a liquid vehicle, and the liquid vehicle includes EC, PGMEA, and DPMA respectively satisfying the above ranges.

A vapor pressure of the ink composition at 20° C. and 180° C., surface tension of the ink composition at 23° C., and viscosity of the composition are measured, and the results are shown in Table 3.

[2] A quantum dot-polymer composite is obtained by using the same method as Example 1 except for using the obtained ink composition. A photo-conversion rate of the quantum dot-polymer composite is measured, and the result is shown in Table 4.

[3] The quantum dot-polymer composite is discharged on a glass substrate at room temperature through an inkjet system. A resulting material therefrom is heated at 180° C. to obtain a pattern of the quantum dot-polymer composite (a thickness: 10 μm). The pattern is formed through the inkjet system without clogging a nozzle.

Example 4

[1] An ink composition is prepared according to the same method as Example 1 except for dispersing the quantum dot powder of Reference Example 1 in cyclohexyl acetate (CHA) to obtain a quantum dot solution and adding gamma-butyrolactone having the following chemical formula thereto:

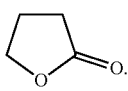

Based on a total solid content of the ink composition, the quantum dot is included in an amount of 55 wt %, the binder is included in an amount of 31 wt %, the monomer is included in an amount of 4 wt %, the initiator is included in an amount of 2 wt %, and $TiO_2$ is included in an amount of 8.3 wt %, and the ink composition also includes 75 wt % of a liquid vehicle, and the liquid vehicle includes EC, PGMEA, and gamma-butyrolactone respectively satisfying the above ranges.

A vapor pressure of the ink composition at 20° C. and 180° C., a surface tension of the composition at 23° C., and viscosity of the composition are measured, and the results are shown in Table 3.

[2] A quantum dot-polymer composite is obtained by using the same method as Example 1 except for using the obtained ink composition. A photo-conversion rate of the quantum dot polymer composite is measured and shown in Table 4.

[3] The quantum dot-polymer composite is discharged on a glass substrate at room temperature through an inkjet system. A resulting material therefrom is heated at 180° C. to obtain a pattern of the quantum dot polymer composite (a thickness: 10 µm). The pattern is formed through the inkjet system without clogging the nozzle.

Example 5

[1] An ink composition is prepared according to the same method as Example 1 except for dispersing the quantum dot powder of Reference Example 1 in cyclohexylacetate (CHA) to obtain a quantum dot solution and adding 2-(2-butoxyethoxy)ethyl acetate having the following chemical formula thereto:

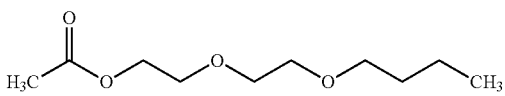

Based on a total solid content of the ink composition, the quantum dot is included in an amount of 55 wt %, the binder is included in an amount of 31 wt %, the monomer is included in an amount of 4 wt %, the initiator is included in an amount of 2 wt %, and $TiO_2$ is included in an amount of 8.3 wt %, and the ink composition also includes 75 wt % of a liquid vehicle, and the liquid vehicle includes EC, PGMEA, and 2-(2-butoxyethoxy)ethyl acetate respectively satisfying the above ranges.

A vapor pressure of the ink composition at 20° C. and 180° C., a surface tension of the composition at 23° C., and viscosity of the composition are measured, and the results are shown in Table 3.

[2] A quantum dot-polymer composite is obtained by using the same method as Example 1 except for using the obtained ink composition. A photo-conversion rate of the quantum dot-polymer composite is measured and shown in Table 4.

[3] The quantum dot-polymer composite is discharged on a glass substrate at room temperature through an inkjet system. A resulting material therefrom is heated at 180° C. to obtain a pattern of the quantum dot-polymer composite (a thickness: 10 µm). The pattern is formed through the inkjet system without clogging the nozzle.

Example 6

[1] An ink composition is prepared according to the same method as Example 1 except for dispersing the quantum dot powder of Reference Example 1 in cyclohexylacetate (CHA) to obtain a quantum dot solution and adding 2-butoxyethylacetate having the following chemical formula thereto:

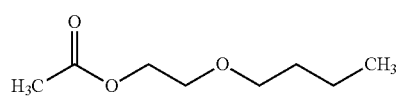

Based on a total solid content of the ink composition, the quantum dot is included in an amount of 55 wt %, the binder is included in an amount of 31 wt %, the monomer is included in an amount of 4 wt %, the initiator is included in an amount of 2 wt %, and $TiO_2$ is included in an amount of 8.3 wt %, and the ink composition also includes 75 wt % of a liquid vehicle, and the liquid vehicle includes EC, PGMEA, and 2-butoxyethyl acetate respectively satisfying the above ranges.

A vapor pressure of the ink composition at 20° C. and 180° C., a surface tension of the composition at 23° C., and viscosity of the composition are measured, and the results are shown in Table 3.

[2] A quantum dot-polymer composite is obtained by using the same method as Example 1 except for using the obtained ink composition. A photo-conversion rate of the quantum dot-polymer composite is measured and shown in Table 4.

[3] The quantum dot-polymer composite is discharged on a glass substrate at room temperature through an inkjet system. A resulting material therefrom is heated at 180° C. to obtain a pattern of the quantum dot-polymer composite (a thickness: 10 µm). The pattern is formed through the inkjet system without clogging the nozzle.

Example 7

[1] An ink composition is prepared according to the same method as Example 1 except for dispersing the quantum dot powder of Reference Example 1 in cyclohexylacetate (CHA) to obtain a quantum dot solution and adding 2-acetylbutyrolactone having the following chemical formula thereto:

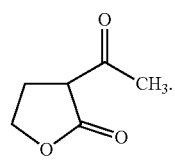

Based on a total solid content of the ink composition, the quantum dot is included in an amount of 55 wt %, the binder is included in an amount of 31 wt %, the monomer is included in an amount of 4 wt %, the initiator is included in an amount of 2 wt %, and $TiO_2$ is included in an amount of 8.3 wt %, and the ink composition also includes 75 wt % of a liquid vehicle, and the liquid vehicle includes EC, PGMEA, and 2-acetylbutyrolactone respectively satisfying the above ranges.

A vapor pressure of the ink composition at 20° C. and 180° C., a surface tension of the composition at 23° C., and viscosity of the composition are measured, and the results are shown in Table 3.

[2] A quantum dot polymer composite is obtained by using the same method as Example 1 except for using the obtained ink composition. A photo-conversion rate of the quantum dot-polymer composite is measured and shown in Table 4.

[3] The quantum dot-polymer composite is discharged on a glass substrate at room temperature through an inkjet system. A resulting material therefrom is heated at 180° C. to obtain a pattern of the quantum dot-polymer composite (a thickness: 10 μm). The pattern is formed through the inkjet system without clogging the nozzle.

Comparative Example 8

[1] An ink composition is prepared according to the same method as Comparative Example 1 except for using 55 wt % of a quantum dot. A vapor pressure of the ink composition at 20° C. and 180° C., a surface tension of the composition at 23° C., and viscosity of the composition are measured, and the results are shown in Table 3.

[2] A quantum dot polymer composite is obtained by using the same method as Example 1 except for using the obtained ink composition. A photo-conversion rate of the quantum dot-polymer composite is measured and shown in Table 3.

[3] The quantum dot-polymer composite is discharged on a glass substrate at room temperature through an inkjet system. When discharged by using a nozzle having an orifice with a diameter of 40 μm, the nozzle is clogged.

Referring to the result, the compositions according to the Examples provide quantum dot-polymer composites having improved photoluminescence characteristics compared with the compositions according to the Comparative Examples.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:
1. An ink composition, comprising
a quantum dot;
a carboxyl group-containing binder polymer;
an electrical insulating polymer precursor;
a radical initiator; and
a liquid vehicle,
wherein the liquid vehicle comprises a mixture of a first organic compound and a second organic compound,
the first organic compound comprises a compound represented by Chemical Formula 1-1, a compound represented by Chemical Formula 2, cyclohexyl acetate, or a combination thereof:

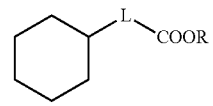

Chemical Formula 1-1 wherein, in Chemical Formula 1-1, L is a single bond or a C1 to C3 substituted or unsubstituted alkylene group, and R is a C1 to C3 alkyl group

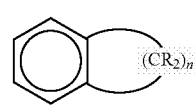

Chemical Formula 2

TABLE 3

| Properties | Example 3 | Example 4 | Example 5 | Example 6 | Example 7 | Comparative Example 8 |
|---|---|---|---|---|---|---|
| Boiling point | 209 | 205 | 192 | 247 | 232 | 145 |
| Vapor pressure [mmHg] 20° C. | 0.08 | 1.5 | 0.2 | 0.01 | 0.019 | 3.7 |
| 180° C. | 316 | 440.9 | 542 | 89 | 131 | 1993 |
| Surface tension (23° C., mN/m) | 27.3 | 35.4 | 27.4 | 30.0 | 39.4 | 26.9 |
| Viscosity (cPs) | 7.5 | 6.9 | 6.5 | 8.3 | 7.5 | 5.9 |

TABLE 4

| Characteristics | Example 3 | Example 4 | Example 5 | Example 6 | Example 7 | Comparative Example 8 |
|---|---|---|---|---|---|---|
| Photo-conversion rate (%) | 33.6% | 31.2% | 33.4% | 33.9% | 30.6% | 31.4% |
| Wavelength (nm) | 540 | 540 | 540 | 540 | 540 | 540 |
| Full width at half maximum (FWHM) (nm) | 35 | 36 | 36 | 35 | 35 | 36 | wherein, in Chemical Formula 2, n is 6 to 10, and each instance of R is the same or different and is independently a hydrogen or a C1 to C3 alkyl group; and the second organic compound comprises a compound represented by Chemical Formula 3, a compound represented by Chemical Formula 4, or a combination thereof:

$$R^1\text{—COO—}[C_nR_{2n+1}O]_m\text{—}R^2 \qquad \text{Chemical Formula 3}$$

wherein, in Chemical Formula 3, $R^1$ and $R^2$ are the same or different and are independently a C1 to C20 alkyl group, n is an integer of 1 to 3, m is an integer of 1 to 10, and each instance of R is the same or different and is independently hydrogen or a C1 to C10 alkyl group,

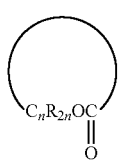

Chemical Formula 4 wherein, in Chemical Formula 4, each instance of R is the same or different and is independently a hydrogen, a C1 to C10 alkyl group, or a C1 to C10 acyl group, and n is an integer ranging from 3 to 6, provided that when the first organic compound is cyclohexyl acetate, then the second organic compound comprises dipropylene glycol methyl ether acetate, 2-(2-butoxyethoxy)ethyl acetate, 2-butoxyethyl acetate, 2-acetylbutyrolactone, or a combination thereof.

2. The ink composition of claim 1, further comprising a multiple thiol compound comprising at least two thiol groups, a metal oxide particulate, or a combination thereof.

3. The ink composition of claim 1, wherein the ink composition does not have gelation or cloudiness.

4. The ink composition of claim 1, wherein the quantum dot comprises a Group II-VI compound, a Group III-V compound, a Group IV-VI compound, a Group IV element or compound, a Group II-III-VII compound, a Group I-II-IV-VI compound, or a combination thereof.

5. The ink composition of claim 1, wherein the carboxyl group-containing binder polymer comprises a copolymer of a monomer mixture comprising a first monomer comprising a carboxyl group and a carbon-carbon double bond, a second monomer comprising a carbon-carbon double bond and a hydrophobic moiety and not comprising a carboxyl group, and optionally a third monomer comprising a carbon-carbon double bond and a hydrophilic moiety and not comprising a carboxyl group, or a multiple aromatic ring-containing polymer comprising a backbone structure comprising two aromatic rings bound to a quaternary carbon atom that is a constituent atom of another cyclic moiety in the backbone structure and comprising a carboxyl group.

6. The ink composition of claim 1, wherein the electrical insulating polymer precursor comprises a (meth)acrylate monomer.

7. The ink composition of claim 1, wherein the first organic compound comprises a compound represented by benzocyclohexane, benzocycloheptane, benzocyclooctane, or a combination thereof.

8. The ink composition of claim 1, wherein the second organic compound comprises propylene glycol monomethyl ether acetate, and an amount of the propylene glycol monomethyl ether acetate is less than or equal to about 20 wt % based on a total weight of the liquid vehicle.

9. The ink composition of claim 8, wherein the second organic compound further comprises dipropylene glycol methyl ether acetate, gamma-butyrolactone, 2-(2-butoxyethoxy)ethyl acetate, 2-butoxyethyl acetate, 2-acetylbutyrolactone, or a combination thereof.

10. The ink composition of claim 9, wherein an amount of the propylene glycol monomethyl ether acetate is less than or equal to about 10 wt % based on a total weight of the liquid vehicle.

11. The ink composition of claim 1, wherein, an amount of the first organic compound is greater than or equal to about 40 wt % and less than about 100 wt % based on a total weight of the liquid vehicle.

12. The ink composition of claim 1, wherein an amount of the second organic compound is greater than 0 wt % and less than or equal to about 60 wt % based on a total weight of the liquid vehicle.

13. The ink composition of claim 1, wherein the ink composition has a viscosity at 25° C. of greater than or equal to about 6.5 cPs and less than or equal to about 8 cPs.

14. The ink composition of claim 1, wherein the ink composition has a surface tension at 23° C. of greater than or equal to about 27 mN/m and less than or equal to about 35 mN/m.

15. The ink composition of claim 1, wherein the ink composition comprises a quantum dot in an amount of greater than about 40 wt % based on a total weight of the solid content.

16. The ink composition of claim 1, wherein the ink composition comprises a quantum dot in an amount of greater than or equal to about 45 wt % based on a total weight of the solid content.

17. The ink composition of claim 1, wherein the ink composition is configured to be sprayed through an opening having a width of less than or equal to about 40 micrometers without clogging the opening.

18. The ink composition of claim 1, wherein the composition comprises:
about 1 wt % to about 40 wt % of the quantum dot;
about 0.5 wt % to about 35 wt % of the carboxyl group-containing binder polymer;
about 0.5 wt % to about 20 wt % of the insulating polymer precursor;
about 20 wt % to about 80 wt % of the liquid vehicle; and
about 0.01 wt % to about 10 wt % of the radical initiator.

19. A method of preparing the ink composition of claim 1, comprising
dispersing the quantum dot in the first organic compound to prepare a quantum dot dispersion; and mixing the quantum dot dispersion with the carboxyl group-containing binder polymer, the electrical insulating polymer precursor, the radical initiator, and the second organic compound.

20. The method of claim 19, wherein the mixing comprises dissolving the carboxyl group-containing binder polymer, and optionally, the electrical insulating polymer precursor, the radical initiator, or a combination thereof in the second organic compound to obtain a second dispersion, and mixing the second dispersion with the quantum dot dispersion.

21. A method of producing a quantum dot-polymer composite pattern comprising:
depositing the ink composition of claim 1 on a substrate by using a droplet discharging apparatus to form a patterned film; and heating the patterned film to remove the liquid vehicle and to perform polymerization of the electrical insulating polymer precursor.

* * * * *